(12) United States Patent
Tangudu et al.

(10) Patent No.: US 11,095,485 B2
(45) Date of Patent: Aug. 17, 2021

(54) FREQUENCY-DOMAIN IQ MISMATCH ESTIMATION

(71) Applicant: TEXAS INSTRUMENTS INCORPORATED, Dallas, TX (US)

(72) Inventors: Jawaharlal Tangudu, Bengaluru (IN); Sashidharan Venkatraman, Bengaluru (IN); Sundarrajan Rangachari, Bengaluru (IN); Sarma Sundareswara Gunturi, Bengaluru (IN); Sthanunathan Ramakrishnan, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/695,586

(22) Filed: Nov. 26, 2019

(65) Prior Publication Data

US 2020/0177417 A1    Jun. 4, 2020

(30) Foreign Application Priority Data

Nov. 30, 2018  (IN) .............................. 201841045417

(51) Int. Cl.
*H04B 1/00*     (2006.01)
*H04L 25/03*    (2006.01)
*H04L 25/02*    (2006.01)

(52) U.S. Cl.
CPC ..... *H04L 25/03159* (2013.01); *H04B 1/0053* (2013.01); *H04L 25/0204* (2013.01)

(58) Field of Classification Search
CPC .......... H04L 27/3863; H04L 25/03057; H04L 25/03; H04L 25/03885; H04L 25/0204; H04L 25/03019; H04L 25/03159; H04B 1/0053
USPC ................ 375/219, 221, 232, 295, 340, 343
See application file for complete search history.

(56) References Cited

U.S. PATENT DOCUMENTS

| | | | |
|---|---|---|---|
| 7,020,226 B1 | 3/2006 | Kirkland | |
| 8,204,102 B2 | 6/2012 | O'Leary et al. | |
| 10,097,396 B2 | 10/2018 | Sestok, IV | |
| 10,382,087 B1 | 8/2019 | Dror et al. | |
| 10,484,108 B1* | 11/2019 | Al-Qaq | H04L 7/0331 |
| 2004/0203472 A1 | 10/2004 | Chien | |
| 2004/0218522 A1 | 11/2004 | Sundstrom et al. | |
| 2005/0220056 A1 | 10/2005 | Itoh | |
| 2006/0203710 A1 | 9/2006 | Mukkavilli et al. | |
| 2008/0025381 A1 | 1/2008 | Lee et al. | |
| 2008/0075190 A1 | 3/2008 | Lin | |
| 2008/0212662 A1 | 9/2008 | Lee et al. | |
| 2010/0027689 A1* | 2/2010 | Kohlmann | H04L 27/3863 375/260 |
| 2010/0135449 A1* | 6/2010 | Row | H04L 27/364 375/371 |

(Continued)

*Primary Examiner* — Emmanuel Bayard
(74) *Attorney, Agent, or Firm* — Valerie M. Davis; Charles A. Brill; Frank D. Cimino

(57) ABSTRACT

An electrical system includes a transceiver with an IQ estimator and an IQ mismatch corrector. The electrical system also includes an antenna coupled to the transceiver. The IQ estimator is configured to perform frequency-domain IQ mismatch analysis to determine an IQ mismatch estimate at available frequency bins of a baseband data signal. The IQ mismatch corrector is configured to correct the baseband data signal based on the IQ mismatch estimate.

20 Claims, 9 Drawing Sheets

(56) References Cited

U.S. PATENT DOCUMENTS

| | | | |
|---|---|---|---|
| 2010/0232493 A1* | 9/2010 | Thirumoorthy | H04L 27/0014 375/232 |
| 2010/0313094 A1* | 12/2010 | Kubota | H04L 27/3863 714/746 |
| 2010/0330929 A1* | 12/2010 | Heutmaker | H04B 1/30 455/73 |
| 2011/0051790 A1* | 3/2011 | Honda | H04B 1/0475 375/224 |
| 2011/0069744 A1* | 3/2011 | Laudel | H04L 27/0014 375/219 |
| 2012/0115412 A1 | 5/2012 | Gainey et al. | |
| 2012/0250790 A1 | 10/2012 | Yang et al. | |
| 2012/0263215 A1* | 10/2012 | Peng | H04B 1/0475 375/221 |
| 2012/0300818 A1 | 11/2012 | Metreaud et al. | |
| 2012/0328041 A1 | 12/2012 | Chen et al. | |
| 2013/0058387 A1* | 3/2013 | Muhammad | H04B 15/04 375/222 |
| 2013/0058388 A1* | 3/2013 | Muhammad | H04B 15/04 375/222 |
| 2013/0195152 A1* | 8/2013 | Muhammad | H04B 17/11 375/219 |
| 2013/0208770 A1* | 8/2013 | Muhammad | H04B 1/0475 375/219 |
| 2013/0208827 A1* | 8/2013 | Muhammad | H04L 27/367 375/297 |
| 2013/0281028 A1 | 10/2013 | Sun et al. | |
| 2014/0092947 A1 | 4/2014 | Reial et al. | |
| 2015/0094082 A1 | 4/2015 | Gupta et al. | |
| 2015/0229497 A1* | 8/2015 | Dhayni | H04L 25/03159 375/219 |
| 2016/0182162 A1 | 6/2016 | Belitzer et al. | |
| 2016/0323010 A1* | 11/2016 | Wu | H04L 27/364 |
| 2016/0359614 A1 | 12/2016 | Hao et al. | |
| 2017/0264477 A1* | 9/2017 | Qu | H04L 27/2634 |
| 2019/0036749 A1 | 1/2019 | Erez et al. | |
| 2020/0028500 A1* | 1/2020 | Cheng | H03K 17/687 |

* cited by examiner $Y(f) = H_{mis}(f)X^*(-f) + H_{ch}(f)X(f)$

FREQUENCY-DOMAIN IQ MISMATCH ESTIMATION

CROSS-REFERENCE TO RELATED APPLICATIONS

This application claims priority to Indian Provisional Application No. 201841045417, filed Nov. 30, 2018, which is hereby incorporated by reference.

BACKGROUND

Many modern electronic devices are networked together via wired or wireless channels and have transceivers to enable communications. One type of transceiver is a zero-IF transceiver (also known as a direct-conversion, homodyne, or synchrodyne transceiver). With a zero-IF transceiver, an example Zero-IF receiver scenario involves an incoming radio signal that is demodulated using a local oscillator whose frequency is identical to, or very close to the carrier frequency of the intended signal. In an example Zero-IF transmitter scenario, an outgoing radio signal is generated by modulating a baseband signal with a local oscillator whose frequency is identical to, or very close to the carrier frequency of the intended signal. This is in contrast to transceivers that employ intermediate frequencies. Another transceiver option is referred to as a low-IF transceiver, which uses a one-sided baseband signal. For example, an outgoing radio signal is generated by modulating this one-sided baseband signal with a local oscillator whose frequency is offset from the carrier frequency of the intended signal.

Zero-IF transceivers and some low-IF transceivers suffer from transmitter or receiver I/Q mismatch caused by mismatch between the I/Q path components (e.g., digital-to-analog converter (DAC) gain/delay, analog filter poles, and/or mixer gain/phase between the I/Q paths). Also, uncorrected I/Q mismatch image leads to spectral mask violations or error vector magnitude (EVM) limitations. Resolving I/Q mismatch is not a trivial task due to frequency-based variations, temperature-based variations, limited calibration options, spectral characteristics variance of transmitted signals over time, and power variance of transmitted signals over time.

SUMMARY

In accordance with at least one example of the disclosure, an electrical system comprises a transceiver with an IQ estimator and an IQ mismatch corrector. The electrical system also comprises an antenna coupled to the transceiver. The IQ estimator is configured to perform frequency-domain IQ mismatch analysis to determine an IQ mismatch estimate at available frequency bins of a baseband data signal. The IQ mismatch corrector is configured to correct the baseband data signal based on the IQ mismatch estimate.

In accordance with at least one example of the disclosure, a transceiver comprises a data path and an IQ mismatch corrector along the data path. The transceiver also comprises an IQ estimator coupled to the IQ mismatch corrector. The IQ estimator comprises a time-to-frequency converter and a processor coupled to the time-to-frequency converter. The processor is configured to compute a residual IQ mismatch based on frequency bin values of a baseband data signal output by the time-to-frequency converter. The processor is also configured to compute an IQ mismatch estimate by adding the residual IQ mismatch to frequency-domain data for a current set of multi-tap correction coefficients. The IQ estimator also comprises a frequency-to-time converter coupled to the processor and configured to output multi-tap correction coefficients to the IQ mismatch corrector based on the computed IQ mismatch estimate.

In accordance with at least one example of the disclosure, a method comprises receiving a baseband data signal and generating frequency-domain values for the baseband data signal. The method also comprises computing a residual IQ mismatch based on the frequency-domain values. The method also comprises computing an IQ mismatch estimate by adding the residual IQ mismatch to frequency-domain data for a current set of multi-tap correction coefficients. The method also comprises using the IQ mismatch estimate to provide updated multi-tap correction coefficients to an IQ mismatch corrector.

BRIEF DESCRIPTION OF THE DRAWINGS

For a detailed description of various examples, reference will now be made to the accompanying drawings in which.

DETAILED DESCRIPTION

Figure 1:
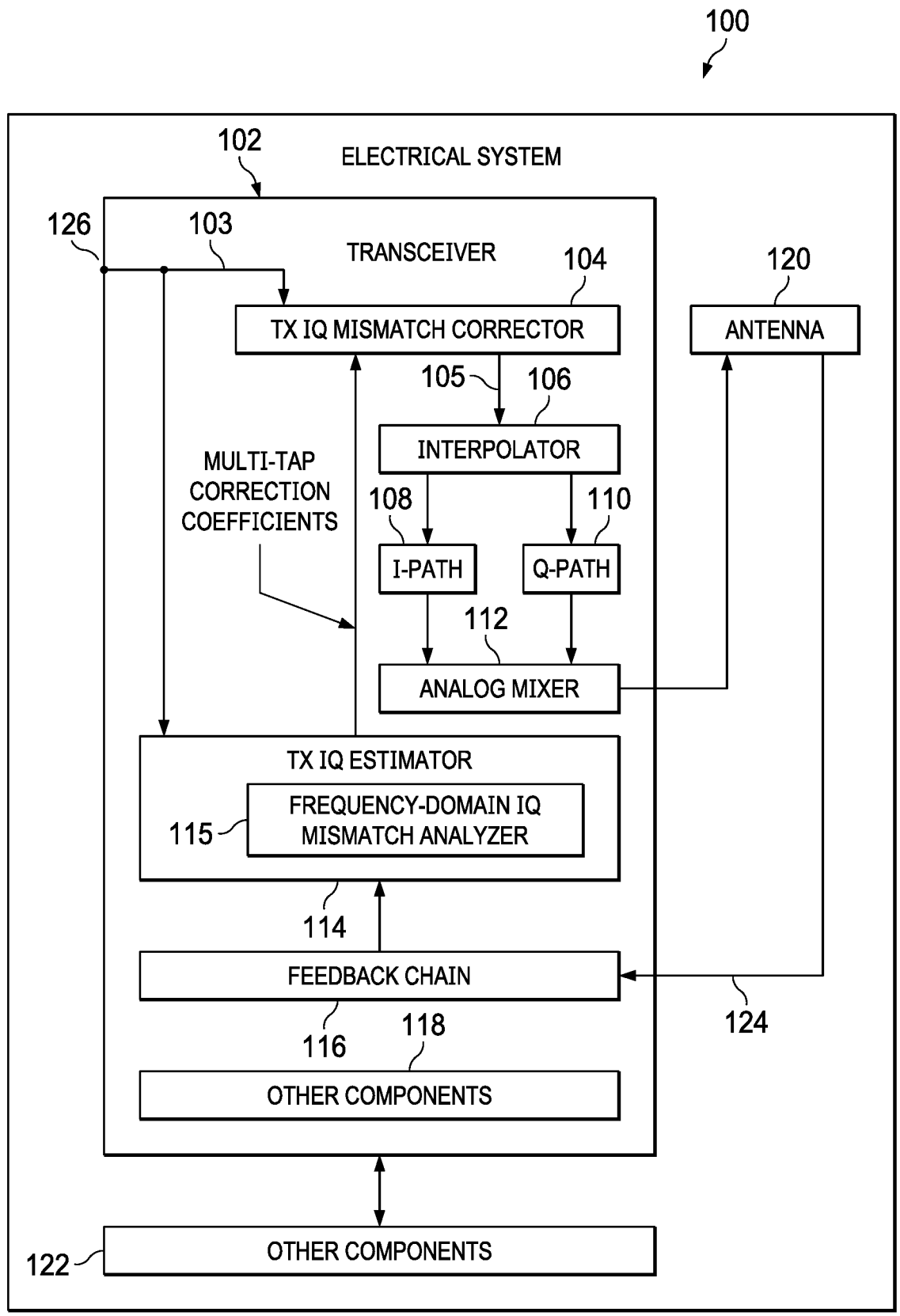
FIG. 1 is a block diagram showing an electrical system with a frequency-domain IQ mismatch analyzer in accordance with some examples.

Disclosed herein are frequency-domain IQ mismatch estimation options and related circuits. In some examples, frequency-domain IQ mismatch estimation is applied in a Zero-IF or low-IF transceiver scenario. In some examples, frequency-domain IQ mismatch estimation and related correction operations are applied along a transmitter (TX) data path of a Zero-IF or low-IF transceiver. In other examples, frequency-domain IQ mismatch estimation and related correction operations are applied along a receiver (RX) data path of a Zero-IF or low-IF transceiver.

In an example TX or RX path scenario, an IQ mismatch corrector along the TX or RX data path includes a delay circuit and a combine circuit along the data path. The IQ mismatch corrector also includes a multi-tap correction path in parallel with the delay circuit and between the data path and the combine circuit. The multi-tap correction path includes a multi-tap correction circuit with multi-tap correction coefficients obtained using frequency-domain IQ mismatch analysis.

In an RX path scenario, the multi-tap correction coefficients are provided by an RX IQ estimator, where the RX IQ estimator receives an RX baseband data signal. In some examples, the RX IQ estimator includes a combination of Fast-Fourier Transform (FFT) logic, a processor unit, and a memory module (e.g., part of the processor unit or separate from the processor unit) with instructions. When the instructions are executed by the processor unit, the processor unit performs frequency-domain IQ mismatch estimation operations based on frequency bin values for an RX baseband data signal provided by the FFT logic. In some examples, the frequency-domain IQ mismatch estimation operations for an RX data path scenario includes computing a residual mismatch estimate, and determining a mismatch estimate by adding the residual mismatch estimate to frequency-domain values for a current set of multi-tap correction coefficients.

In some examples, the residual mismatch estimate is computed based on a correlation of the RX baseband data signal at +f and −f along with quality metrics (e.g., power). In some examples, for mismatch estimation at +f (leakage into +f from −f), RX data signal power at −f should be larger and at +f should be smaller than a respective threshold. Similarly for mismatch estimation at −f (leakage into −f from +f), RX signal power at +f should be larger and at −f should be smaller than respective thresholds. The mismatch correlation, $X(f)X(-f)$, when aggregated across multiple data chunks will give an averaged estimate. Also, a quality metric is computed for the mismatch estimate using the aggregated powers. For every frequency bin, the mismatch estimate is input to a tracking filter (e.g., a Kalman filter) which tracks the mismatch response at available frequency bins. In other words, a history of mismatch estimates is maintained and is used to determine updated multi-tap correction coefficients. Once the RX IQ estimator has determined updated multi-tap correction coefficients based on frequency-domain IQ mismatch estimation operations, these updated coefficients are applied to an RX IQ corrector along the RX data path.

In a TX path scenario, the multi-tap correction coefficients are provided by a TX IQ estimator, where the TX IQ estimator receives a TX baseband data signal and a feedback (FB) baseband data signal. In some examples, the TX IQ estimator includes a combination of FFT logic, a processor unit, and a memory module (e.g., part of the processor unit or separate from the processor unit) with instructions. In some examples, the frequency-domain IQ mismatch estimation operations for a TX data path scenario includes computation of correlations (e.g., a mismatch correlation, a channel correlation, and a signal cross correlation) and power. Based on at least some of the correlations, observed residual mismatch is computed. Also, based on at least some of the correlations, a channel estimate is computed and a channel estimate history is maintained. Also, the actual residual mismatch is computed based on the computed channel estimate and the computed observed residual mismatch. The actual mismatch is then computed by adding frequency information for a current set of multi-tap correction coefficients to the computed actual residual mismatch. Also, a mismatch response history is maintained and is used to determine updated multi-tap correction coefficients. Once the TX IQ estimator has determined updated multi-tap correction coefficients based on the frequency-domain IQ mismatch estimation operations, these updated coefficients are applied to an TX IQ corrector along the TX data path. To provide a better understanding, various frequency-domain IQ mismatch estimation options and related circuits and systems are described using the figures as follows.

FIG. 1 is a block diagram showing an electrical system 100 in accordance with some examples. The electrical system 100 includes a transceiver 102 (e.g., a Zero-IF transceiver or a low-IF transceiver) coupled to an antenna 120. In some examples, the electrical system 100 also includes other components 122 (e.g., data processors, memory storage) coupled to the transceiver 102 to prepare data for transmission or to process received data. Examples of the electrical system 100 include a base station with the transceiver 102, a consumer or commercial product with a Wi-Fi transceiver corresponding to the transceiver 102, a consumer or commercial product with a WiMAX transceiver corresponding to the transceiver 102, a consumer or commercial product with a cellular transceiver corresponding to the transceiver 102, or any other electrical system where IQ mismatch is of concern.

In the example of FIG. 1, the transceiver 102 in configured to perform frequency-domain IQ mismatch analysis and correction for a transmitter data path. Accordingly, as shown in FIG. 1, the transceiver 102 includes a TX IQ mismatch corrector 104 configured to receive a TX baseband data signal 103 from a TX baseband node 126 of the transceiver 102, where the TX baseband node 126 is coupled to the other components 122 or to a TX baseband data path internal to the transceiver 102. In the disclosed examples, the TX IQ mismatch corrector 104 is configured to apply a frequency-dependent IQ mismatch correction to the TX baseband data signal 103, where the frequency-dependent IQ mismatch correction is based on frequency-domain IQ mismatch analysis. A corrected TX baseband data signal 105 is output from the TX IQ mismatch corrector 104 to an interpolator 106 configured to upsample the corrected TX baseband data signal 105 by a factor (e.g., L).

As represented in FIG. 1, the interpolator 106 provides outputs to I-path circuitry 108 and to Q-path circuitry 110. In some examples, the I-path circuitry 108 includes a digital-to-analog converter (DAC) and a filter. Similarly, in some examples, the Q-path circuitry 110 includes a DAC and a filter. The outputs of the I-path circuitry 108 and the Q-path circuitry 110 are provided to an analog mixer 112. In some examples, the analog mixer 112 includes mixer components and an adder circuit. The output of the analog mixer 112 is provided to the antenna 120. In some examples, the output of the analog mixer 112 is amplified and is provided to the antenna 120. The signal 124 at the antenna 120 is also provided to a feedback chain 116 of the transceiver 102. In some examples, the feedback chain 116 includes a radio frequency (RF) analog-to-digital converter (ADC) and a decimation circuit. The output of the feedback chain 116 is provided to a TX IQ estimator 114. The TX IQ estimator 114 includes a frequency-domain IQ mismatch analyzer 115 and is configured to determine and/or update multi-tap correction coefficients for use by the TX IQ mismatch corrector 104 based on frequency-domain IQ mismatch analysis as described herein.

Figure 2:
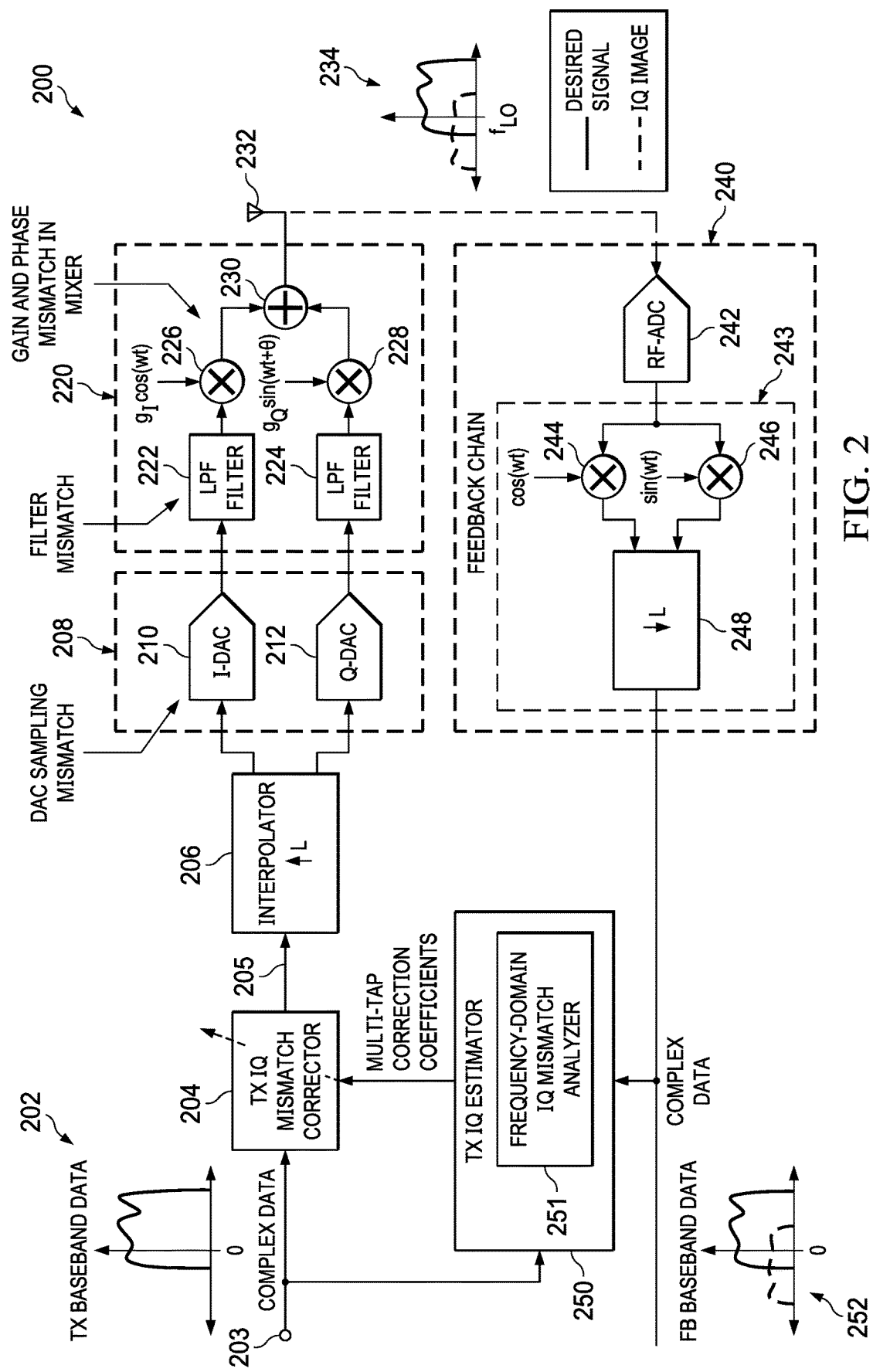
FIG. 2 is a diagram showing a transmitter topology with a frequency-domain IQ mismatch analyzer in accordance with some examples.

FIG. 2 is a diagram showing a transmitter 200 with frequency-dependent mismatch correction in accordance with some examples. As shown, the transmitter 200 includes a TX IQ mismatch corrector 204 (an example of the TX IQ mismatch corrector 104 in FIG. 1) configured to receive a TX baseband data signal 202 from a TX baseband node 203, where the TX baseband node 203 is coupled to a TX baseband data path internal to the transmitter 200. In FIG. 2, the transmitter 200 corresponds to a Zero-IF transmitter as indicated by the TX baseband data signal 202 having a spectrum on both sides of a carrier signal. In a low-IF scenario, the TX baseband data signal 202 would have a spectrum to the left or to the right of the carrier signal.

In the disclosed examples, the TX IQ mismatch corrector 204 is configured to apply a frequency-dependent IQ mismatch correction to the TX baseband data signal 202. In some examples, the TX IQ mismatch corrector 204 uses multi-tap correction coefficients supplied by a TX IQ estimator 250 (an example of the TX IQ estimator 114 in FIG. 1) to perform frequency-dependent IQ mismatch correction. In the example of FIG. 2, the TX IQ estimator 250 uses a frequency-domain IQ mismatch analyzer 251 to determine the multi-tap correction coefficients. A corrected TX baseband data signal 205 is output from the TX IQ mismatch corrector 204 to an interpolator 206 configured to upsample the corrected TX baseband data signal 205 by a factor (e.g., L).

As represented in FIG. 2, the interpolator 206 provides outputs to DAC circuitry 208 including a I-DAC 210 (an example of the I-path circuitry 108 in FIG. 1) and a Q-DAC 212 (an example of the Q-path circuitry 110 in FIG. 1). The output of the DAC circuitry 208 is provided to an analog mixer 220 (an example of the analog mixer 112 in FIG. 1). As shown, the analog mixer 220 includes a low-pass filter (LPF) 222 and a multiplier 226 (to apply $g_I \cos(wt)$ to the output of LPF 222) in series with the I-DAC 210. The analog mixer 220 also includes an LPF 224 and a multiplier 228 (to apply $g_Q \cos(wt+\theta)$ to the output of LPF 224) in series with the Q-DAC 212. The outputs of the multipliers 226 and 228 are input to an adder circuit 230, and the output of the adder circuit 230 is provided to an antenna 232 (an example of the antenna 120 in FIG. 1). In some examples, the output of the adder circuit 230 is amplified and provided to the antenna 232.

The transmit signal 234 at the antenna 232 is provided to a feedback (FB) chain 240 (e.g., an example of the feedback chain 116 in FIG. 1). As shown, the FB chain 240 includes a radio frequency (RF) ADC 242 and a decimation circuit 243. Also, the decimation circuit 243 includes digital mixers 244 and 226, and a downsampler 248. The output of the decimation circuit 243 is a FB baseband data signal 252, which is provided to the TX IQ estimator 250. The TX IQ estimator 250 also receives the TX baseband data signal 202 from the TX baseband node 203. With the frequency-domain IQ mismatch analyzer 251, the TX IQ estimator 250 is configured to determine and/or update multi-tap correction coefficients for use by the TX IQ mismatch corrector 204 based on frequency-domain IQ mismatch analysis as described herein.

Figure 3:
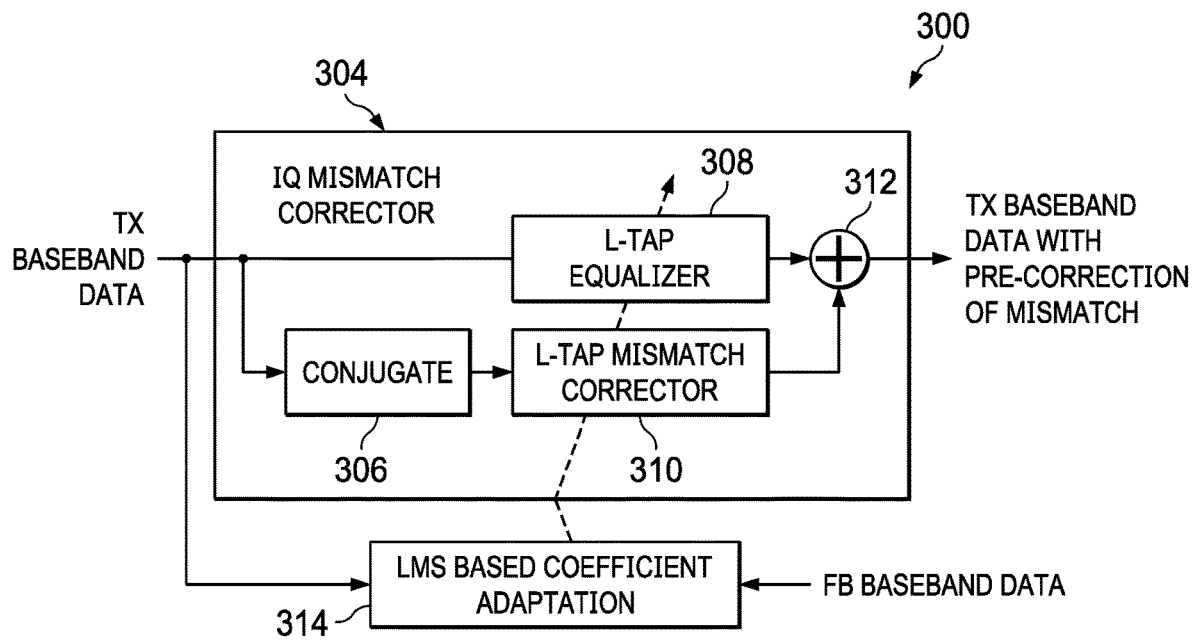
FIG. 3 is a block diagram of an IQ mismatch estimation and correction topology in accordance with some examples.

FIG. 3 is a block diagram of an IQ mismatch estimation and correction topology 300 in accordance with some examples. In the IQ mismatch estimation and correction topology 300, an IQ mismatch corrector 304 includes an L-tap equalizer 308 configured to receive a TX baseband data signal, where the equalized signal is provided to a combine circuit 312. The combine circuit also receives the output of a conjugate circuit 306 in series with an L-tap mismatch corrector 310, where the input to the conjugate circuit 306 is the TX baseband data signal. The output of the combine circuit 312 is the TX baseband data signal with pre-correction of IQ mismatch. In the example of FIG. 3, a least mean square (LMS)-based coefficient adaptation circuit 314 is used to provide the coefficients for the L-tap equalizer 308 and the L-tap mismatch corrector 310, where the adaptation is based on the TX baseband data signal and an FB baseband data signal.

With the IQ mismatch estimation and correction topology 300, changes to the signal characteristics over time cause the coefficients to become stale and thus re-convergence is needed. Also, correction limits (e.g., about −55 dBc) and variations in signal frequency profile and signal power are problematic. Also, since coefficients are continuously adapted with the IQ mismatch estimation and correction topology 300, the TX path (the path with the L-tap equalizer 308) is continuously changing, which affects other algorithms on the TX path such as a Digital Pre-Distortion (DPD) algorithm. Running IQ mismatch correction and DPD together on the same TX path is undesirable.

Another IQ mismatch estimation and correction option involves IQ mismatch estimation using power detectors in analog. For example, a wireless local area network (WLAN) transmitter is able to monitor a power detector output between I and Q paths to estimate gain mismatch. However, this IQ mismatch correction option is limited (e.g., about −40 dBc) and relies on frequency independent estimation. Also, periodic offline time for calibration is needed.

Figure 4A:
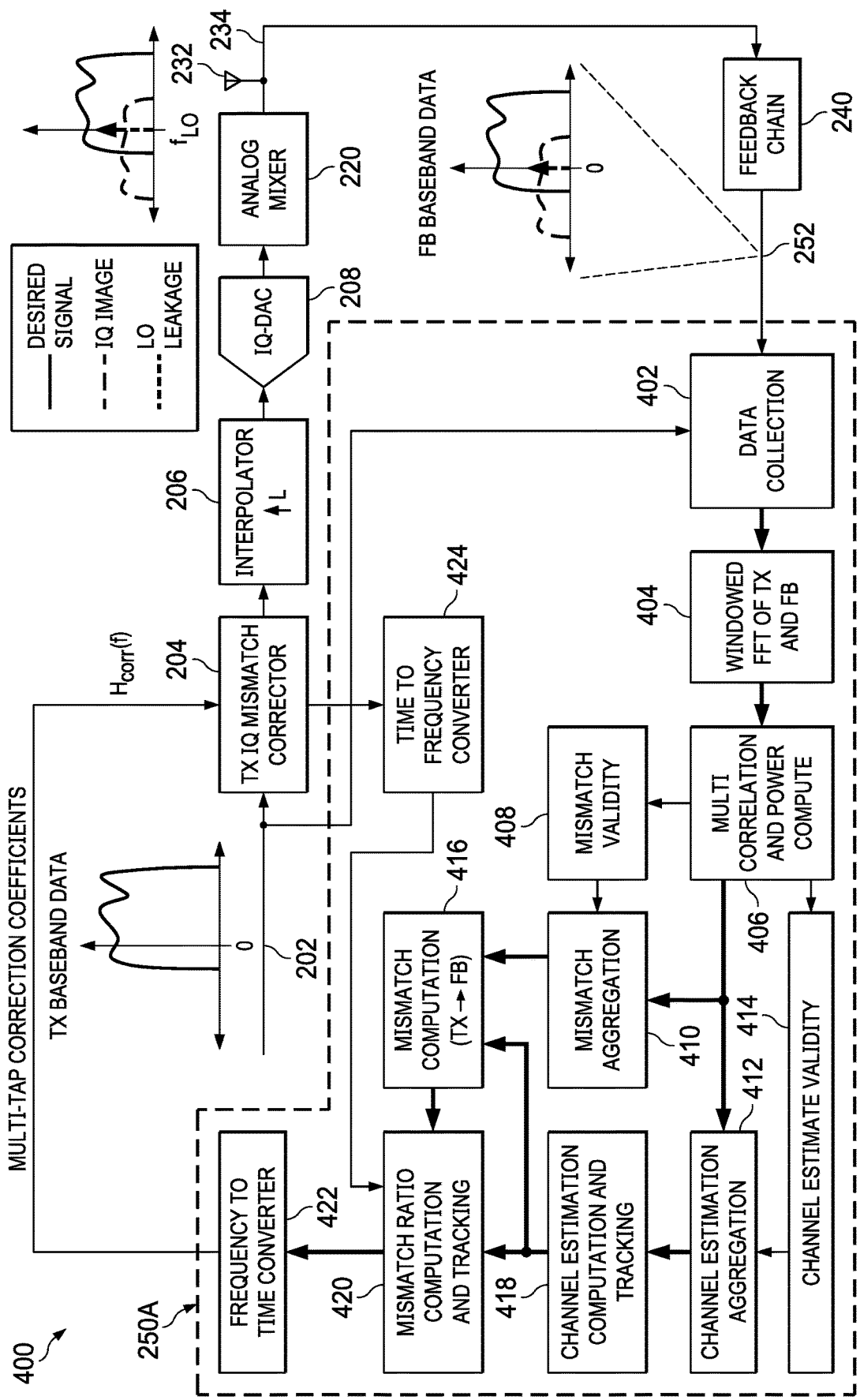
FIG. 4A is a diagram showing a transmitter with frequency-domain IQ mismatch analysis along a transmitter data path in accordance with some examples.

In contrast to the IQ mismatch estimation and correction topology 300 of FIG. 3, or an IQ mismatch estimation and correction option using power detectors in analog, the proposed solution based on frequency-domain IQ mismatch analysis is more robust, accounts for time varying signal scenarios, and complies with a target performance (e.g., around −65 dBc) across the band. FIG. 4A is a diagram showing a transmitter 400 with frequency-domain IQ mismatch correction in accordance with some examples. In FIG. 4, the transmitter 400 corresponds to a Zero-IF transmitter as indicated by the TX baseband data signal 202 having a spectrum on both sides of a carrier signal. In a low-IF scenario, the TX baseband data signal 202 would have a spectrum to the left or to the right of the carrier signal. As shown, the transmitter 400 includes many of the components introduced in FIG. 2, including the TX IQ mismatch corrector 204, the interpolator 206, the DAC circuitry 208, the analog mixer 220, the antenna 232, and the FB chain 240. Again, the input to the FB chain 240 is the transmit signal 234 and the output of the FB chain 240 is the FB baseband data signal 252.

In the example of FIG. 4A, various operations for the TX IQ estimator 250A (an example of the TX IQ estimator 250 in FIG. 2) of the transmitter 400 are represented, including frequency-domain IQ mismatch analysis operations. More specifically, the TX IQ estimator 250A includes a data collection block 402 configured to provide windowed FFT values 404 for the TX baseband data signal 202 and the FB baseband data signal 252. In some examples, the operations of the data collection block 402 are performed by an FFT engine, where the windowed FFT values 404 output from the data collection block 402 are input to a multi-correlation and power compute block 406. The outputs of the multi-correlation and power compute block 406 are used by a mismatch validity block 408, a mismatch aggregation block 410, a channel estimation aggregation block 412, and a channel estimate validity block 414. In some examples, the power levels determined by the multi-correlation and power compute block 406 are used to determine a validity of channel estimates and/or mismatch estimates. In some examples, block 406 uses correlation and power equations given as:

$$\frac{\sum Y(f)X(-f)}{\sum \|X(-f)\|^2}, \frac{\sum X(f)X(-f)}{\sum \|X(f)\|^2}, \frac{\sum Y(f)X^*(f)}{\sum \|Y(f)\|^2},$$

where X(f) is the TX baseband data signal spectrum and Y(f) is the FB baseband data signal spectrum.

As needed, some of the multi-correlation information is discarded or weighted differently based on the validity operations of blocks 408 and 414. Over time, aggregated mismatch estimates are determined by block 410, and aggregated channel estimates are determined by block 412. The output of the block 412 is input to a channel estimation computation and tracking block 418, and the output of the block 410 is input to a mismatch computation block 416. As shown, the mismatch computation block 416 also receives the output of the channel estimation computation and tracking block 418 so that the IQ mismatch determined by the mismatch computation block 416 accounts for frequency-dependent channel effects. In some examples, the mismatch as a function of frequency is given as:

$$\hat{H}_{mis}(f) = \frac{\sum Y(f)X(-f) - (\sum X(f)X(-f))\hat{H}_{ch}(f)}{\sum |X(-f)|^2} = \frac{\sum Y_c(f)X(-f)}{\sum |X(-f)|^2},$$

where $Y_c(f) = Y(f) - X(f)\hat{H}_{ch}(f)$ and where $\hat{H}_{ch}(f)$ is the channel estimate.

The output of the mismatch computation block 416 and the output of the channel estimation computation and tracking block 418 are input to a mismatch ratio computation and tracking block 420. In some examples, block 420 calculates the mismatch ratio or actual mismatch as:

$$\hat{H}_{mis\_act}(f) = \frac{\hat{H}_{mis}(f)}{\hat{H}_{ch}(f)},$$

where $\hat{H}_{mis\_act}(f)$ is an actual mismatch estimate that accounts for the channel effects. Block 420 also adds the new mismatch ratio information to available frequency-domain values related to a current set of multi-tap correction coefficients used by the TX IQ mismatch corrector 204. In some examples, these frequency-domain values are provided by a time-to-frequency converter 424 coupled to the TX IQ mismatch corrector 204 and block 420. The output of the mismatch ratio computation and tracking block 420 is provided to a frequency-to-time converter 422, resulting in updated multi-tap correction coefficients, $H_{corr}(f)$, for use by the TX IQ mismatch corrector 204.

In some examples, the operations of the TX IQ estimator 250A includes synchronous data collection (block 402) of TX and FB baseband data chunks followed by a windowed FFT engine (block 404). In some examples, the FFT operations are performed at a first rate (e.g., every 1-2 us). The operations of the TX IQ estimator 250A also include frequency bin based correlation of TX and FB baseband data signals as well as channel estimation (e.g., blocks 408, 410, 412, 414, 416). Also, mismatch estimation and uncertainty metrics are performed (e.g., blocks 416 and 420). Also, separate validity conditions and aggregation of the correlations and powers for channel estimation and mismatch estimation are performed (e.g., blocks 408, 410, 412, 414). In some examples, aggregation operations are also performed at the first rate, while results of the aggregation and subsequent operations are performed at a second rate (e.g., 10 ms) that is slower compared to the first rate (e.g., 2 us). Also, mismatch estimation aided by a Kalman filtered channel estimate is performed (e.g., blocks 418 and 420). Because mismatch correlations are impacted by strong signals at image locations (e.g., block 410), the impact of strong signals is suppressed by use of a signal cross correlation and tracked channel estimate (e.g., block 418). In some examples, the correlations and power estimated are aggregated based on defined validity conditions. One example validity condition is that for apparent mismatch estimation at +f, the TX data signal power at −f should be larger than a predetermined threshold. At +f, the TX data signal power be smaller than the predetermined threshold. Also, for channel estimation at +f, the TX signal power at +f should be larger and at −f should be smaller.

The quality metric of the residual apparent mismatch estimate is computed after accounting for the amount of interference suppression. In some examples, the residual apparent mismatch estimate is scaled by the channel estimate and is added with the frequency response of the correction filter response to get back the overall mismatch response, which is tracked by a Kalman filter (or a similar filter) that accounts for current data and historical data. In some examples, the quality of estimates including the signal suppression effect is computed for history tracking (e.g., blocks 418 and 420). In some examples, the quality of the mismatch ratio computed by block 418 is given as:

$$\text{Quality}(\hat{H}_{mis\_act}(f)) = \frac{(\sum |Y_c(f)|^2)(\sum |X(-f)|^2) - |\sum Y_c(f)X(-f)|^2}{N*(\sum |X(-f)|^2)^2 |\hat{H}_{ch}(f)|^2},$$

where N is the number of aggregations. Other quality estimates are determined as well (e.g., a quality metric for channel estimates). In some examples, the quality estimates (e.g., the standard deviation of the estimates) are used for Kalman filtering operations related to history maintenance of channel estimates and mismatch estimates (e.g., blocks 418 and 420). In some examples, the TX IQ estimator 250A performs the example algorithm given below.

Example TX IQ Mismatch Estimation Algorithm for the TX IQ Estimator 250A

Collect TX and FB baseband data signal chunks synchronously after accounting for round trip delay between the TX and FB baseband data signals.
    Window the data x(t) and y(t) by a standard window function like Black-Mann Harris.
    Compute FFT on the windowed base-band data to convert to frequency domain X(f) and Y(f) for both the TX baseband data signal and the FB baseband data signal.
Compute multiple correlation from the frequency bins for the TX and FB baseband data signals to obtain apparent mismatch and channel estimates along with their quality metrics
    Apparent mismatch (or observed mismatch) is the mismatch response from the TX baseband data signal at −f to the FB baseband data signal at +f.
    Channel estimate is the overall channel response from TX baseband data signal to the FB baseband data signal (includes TX and FB data paths).

Correlations are computed: 1) mismatch correlation, Y(f)X(−f); 2) channel correlation, Y(f)X*(f); and 3) signal cross correlation, X(f)X(−f).

Powers Computed $\|X(-f)\|^2$, $\|X(f)\|^2$, $\|Y(f)\|^2$

X(f) and Y(f) represent the frequency response of the TX and FB baseband data signals respectively These 3 correlations and 3 powers are used for both apparent mismatch estimation and channel estimation Note that apparent mismatch estimation is always the residual apparent mismatch estimation based on what is left over considering the current IQ mismatch correction filter configuration.

These correlations and powers are aggregated across multiple data chunks based on defined validity conditions For apparent mismatch estimation at +f (i.e., mismatch at FB '−f' due to TX signal at '+f'), the TX signal power at −f should be larger and at +f should be smaller than a preconfigured threshold For channel estimation at +f, TX signal power at +f should be larger and at −f should be smaller The three correlations and the three powers are aggregated separately for apparent mismatch estimation and channel estimation since they have separate validity.

The mismatch correlation Y(f)X(−f), when aggregated will lead to residual apparent mismatch estimate but is impacted by interference from signal at +f The interference from TX Signal at +f in aggregated mismatch correlations Y(f)X(−f) is predicted and suppressed.

Predicted Interference is the product of aggregated signal cross correlation and current channel estimate.

Predicted Interference is subtracted from the aggregated mismatch correlation

A quality metric is computed for the estimate of residual apparent mismatch estimate after accounting for the suppression of interference Channel estimate and its quality are computed based on aggregated channel correlations For every frequency bin, the residual apparent mismatch estimate if available is scaled by the channel estimate at that frequency and added with the frequency response of the current correction filter.

This represents the overall actual mismatch response at that frequency.

This response is input to a tracking filter (e.g., Kalman filter) which tracks the mismatch response at available frequency bins.

The tracked mismatch frequency response is converted to a time domain correction filter coefficients and programmed back into a mismatch correction filter in the TX data path In the correction module, the conjugated input TX baseband data signal is passed through the correction filter and subtracted from the delayed input TX baseband data signal, where the delay is selected to match the group delay of the correction filter.

In an alternate embodiment, the correction can be implemented by first passing the input signal through a correction filter followed by conjugation before subtraction on the main path. Note that the correction filter in this case, in the time domain, will simply be a conjugate of the time domain correction filter in the original case.

Example TX IQ Mismatch Estimation Equations Used by the TX IQ Estimator 250A $$H_{mis}^{\wedge}(f) = \frac{\sum Y(f)X(-f) - (\sum X(f)X(-f))H_{ch}^{\wedge}(f)}{\sum |X(-f)|^2}$$

-continued $$\text{Quality}(H_{mis}^{\wedge}(f)) = \frac{(\sum |Y_c(f)|^2)(\sum |X(-f)|^2) - |\sum Y_c(f)X(-f)|^2}{N*(\sum |X(-f)|^2)^2},$$

where $H^{[<]\text{BEGINITAL}m}{}_{mis}(f)$ is an estimate of residual apparent (observed) mismatch and N is the number of aggregations.

$$Y_c(f) = Y(f) - X(f)H_{ch}^{\wedge}(f)$$

$$H_{mis\_act}^{\wedge}(f) = \frac{H_{mis}^{\wedge}(f)}{H_{ch}^{\wedge}(f)}$$

$$\text{Quality}(H_{mis\_act}^{\wedge}(f)) \approx \frac{\text{Quality}(H_{mis}^{\wedge}(f))}{|H_{ch}^{\wedge}(f)|^2}$$

Figure 4B:
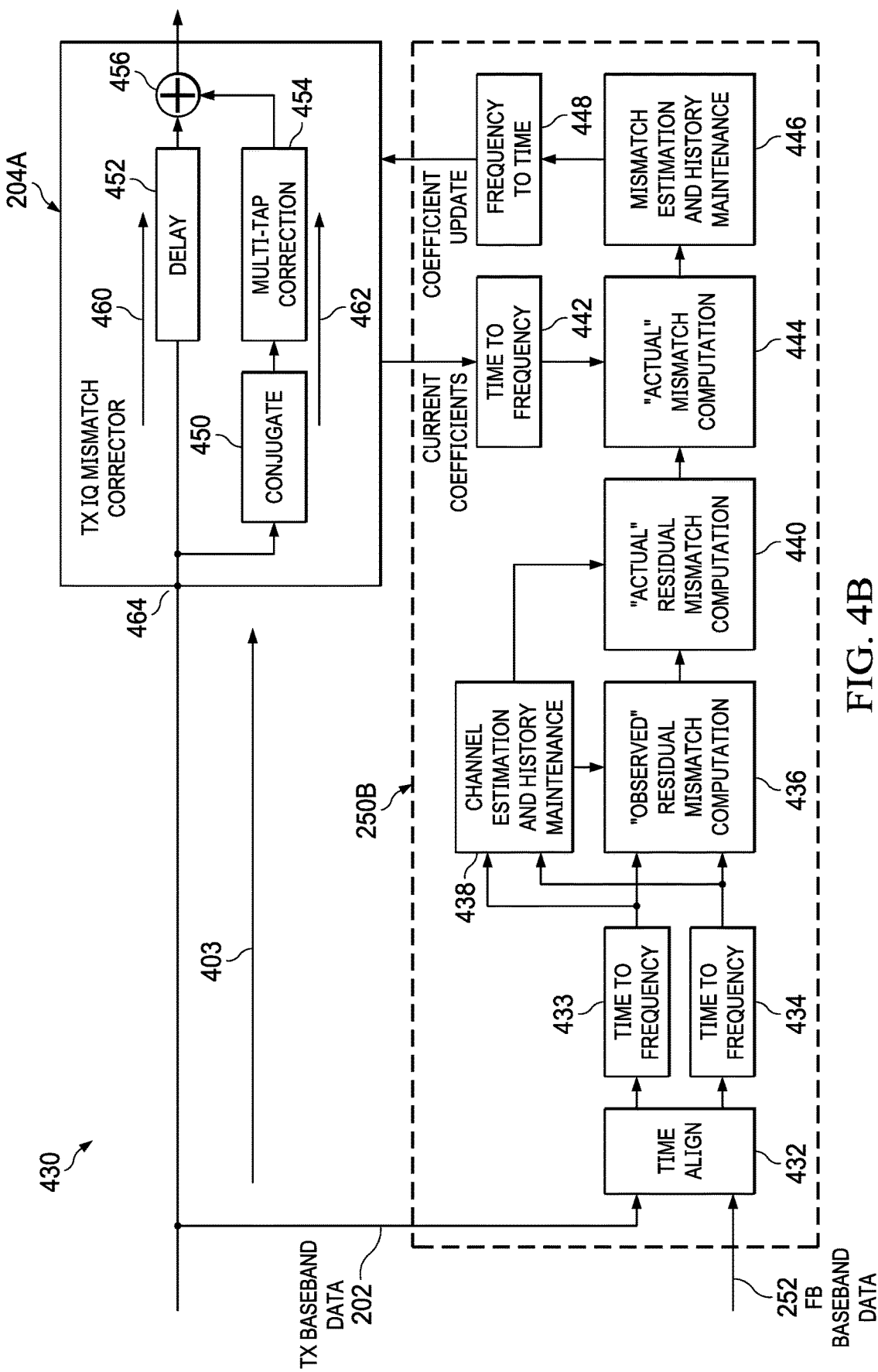
FIG. 4B is a block diagram showing an IQ mismatch estimation and correction topology with frequency-domain IQ mismatch analysis along a transmitter data path in accordance with some examples.

FIG. 4B is a block diagram showing an IQ mismatch estimation and correction topology 430 with frequency-domain IQ mismatch analysis in accordance with some examples. With the IQ mismatch estimation and correction topology 430, IQ mismatch estimation and correction is performed for available frequencies of a TX baseband data signal based on frequency-domain IQ mismatch analysis operations. In some examples, the IQ mismatch estimation and correction topology 430 is part of a Zero-IF transmitter data path. In other examples, the IQ mismatch estimation and correction topology 430 is part of a low-IF transmitter data path. Also, the IQ mismatch estimation and correction topology 430 is compatible with DPD algorithms, which is an improvement over the IQ mismatch estimation and correction topology 300.

As shown, the IQ mismatch estimation and correction topology 430 includes a TX IQ mismatch corrector 204A (an example of the TX IQ mismatch corrector 204 in FIG. 2) along a TX data path 403. More specifically, the TX IQ mismatch corrector 204A includes a combine circuit 456 and a delay line path 460 between the combine circuit 456 and a TX baseband data signal node 464 of the TX IQ mismatch corrector 204A. The TX IQ mismatch corrector 204A also includes a mismatch correction path 462 separate from the delay line path 460. The mismatch correction path 462 is between the transmitter baseband data signal node 464 and the combine circuit 456. In the example of FIG. 4B, the mismatch correction path 462 includes a conjugate circuit 450 coupled to a multi-tap (e.g., L-tap) correction circuit 454, where the multi-tap correction circuit 454 uses multi-tap correction coefficients to perform frequency-dependent IQ mismatch correction. The multi-tap correction coefficients for the multi-tap correction circuit 454 are provided by a TX IQ estimator 250B (an example of the TX IQ estimator 250 in FIG. 2).

In the example of FIG. 4B, the TX IQ estimator 250B includes various blocks, which correspond to frequency-domain IQ mismatch analysis operations performed by hardware (e.g., an FFT engine) and/or a processor executing instructions stored in memory. Specifically, the TX IQ estimator 250B includes a time align block 432 configured to align the TX baseband data signal 202 and the FB baseband data signal 252. The output of the time align block 432 is input to time-to-frequency blocks 433 and 434, which provide windowed FFT values of the TX baseband data signal 202 and the FB baseband data signal 252. In different examples, the size of the windows used to generate the FFT values depends on a target frequency sensitivity. Also, the speed of the time align block 432 and the time-to-frequency converters 433 and 434 vary in different examples. In one example, the time align block 432 and the time-to-frequency converters 433 and 434 operate at a speed of 2 us. In some examples, the operations of the time align block 432 and the time-to-frequency converters 433 and 434 correspond to blocks 402 and 404 in FIG. 4A, and are performed by an FFT engine.

As shown, the outputs of the time-to-frequency blocks 433 and 434 are input to an observed residual mismatch computation block 436 and to a channel estimation and history maintenance block 438. The channel estimation and history block 438 maintains channel effects for each of multiple frequencies over time. In different examples, the speed of operations for blocks 438 and 436 vary. In one example, updates related to block 438 occur every 10 ms. Also, in some examples, channel effects are filtered (e.g., by a Kalman filter or similar filter) that accounts for current data and historical data for available frequency bin, which prioritizes data based on quality and age. Based on channel estimate values determined by block 438 and observed residual mismatch values determined by block 436, an actual residual mismatch computation block 440 determines actual residual mismatch values. The actual residual mismatch values from block 440 and frequency information for a current set of multi-tap correction coefficients are then used by an actual mismatch computation block 444 to determine actual mismatch values. In the example of FIG. 4B, a time-to-frequency converter block 442 is used to provide the frequency information for the current set of multi-tap correction coefficients (e.g., provided by the TX IQ mismatch corrector 204A). The actual mismatch values determined by block 444 are provided to a mismatch estimation and history maintenance block 446, which compares the actual mismatch values with historic mismatch values. In some examples, the mismatch estimation and history maintenance block 446 performs filtering (e.g., a Kalman filter or similar filter) to filter mismatch estimates for available frequency based on quality and age. In one example, an actual residual mismatch quality is computed by block 440 and is provided to block 446 for use in the filter operations. The output of block 446 is provided to a frequency-to-time converter 448, where the output of the frequency-to-time converter 448 corresponds to updated multi-tap correction coefficients for use by the multi-tap correction circuit 454.

With the IQ mismatch estimation and correction topology 430, the delay line path 460 is unaffected by the IQ mismatch correction, which means a DPD algorithm is able to run continuously in parallel with IQ mismatch compensation. In different examples, IQ mismatch compensation related to the IQ mismatch estimation and correction topology 430 is performed continuously, periodically (based on a timer), or as directed by a host controller. In some examples, the host controller includes the TX IQ estimator 250B or is coupled to the TX IQ estimator 250B to direct IQ mismatch estimation and correction operations.

In some alternative examples, frequency-domain IQ mismatch estimation and correction operations are performed without history maintenance. In such examples, the channel estimations and mismatch estimates need to be of good quality (e.g., by aggregating channel and mismatch estimates over a longer period of time). With history maintenance, temperature and voltage variations are tracked, which improves start up speed of estimation of IQ mismatch of a zero-IF transmitter.

In some examples, an IQ estimation (e.g., the TX IQ estimator 250B) is configured to update the multi-tap correction coefficients based on IQ mismatch parameters and channel parameters (e.g., the operations of blocks 436, 438, and/or 444). In some examples, an IQ estimation (e.g., the TX IQ estimator 250B) is configured to update the multi-tap correction coefficients based on a history of IQ mismatch parameters and channel parameters across observed signal frequencies (e.g., the operations of blocks 436, 438, and/or 444). In some examples, an IQ estimation (e.g., the TX IQ estimator 250B) is configured to update the multi-tap correction coefficients based on frequency-dependent observed residual mismatch obtained using windowed FFT values of a baseband data signal and a feedback baseband data signal (e.g., the operations of blocks 432, 433, 434, 436, and 438).

In some examples, an IQ estimation (e.g., the TX IQ estimator 250B) is configured to update the multi-tap correction coefficients based on a frequency-dependent channel estimate obtained using windowed FFT values of a baseband data signal and a feedback baseband data signal (e.g., the operations of blocks 432, 433, 434, and 438). In some examples, an IQ estimation (e.g., the TX IQ estimator 250B) is configured to update the multi-tap correction coefficients by predicting and suppressing interference in IQ mismatch estimation using channel parameters (e.g., channel parameters determined by block 438 are used by blocks 436 and 440). In some examples, an IQ estimator (e.g., the TX IQ estimator 250B) is configured to update the multi-tap correction coefficients based on observed residual IQ mismatch, the channel parameters, and a current set of multi-tap correction coefficients (e.g., the operations of blocks 436, 438, 440, 442, and 444).

Figure 5:
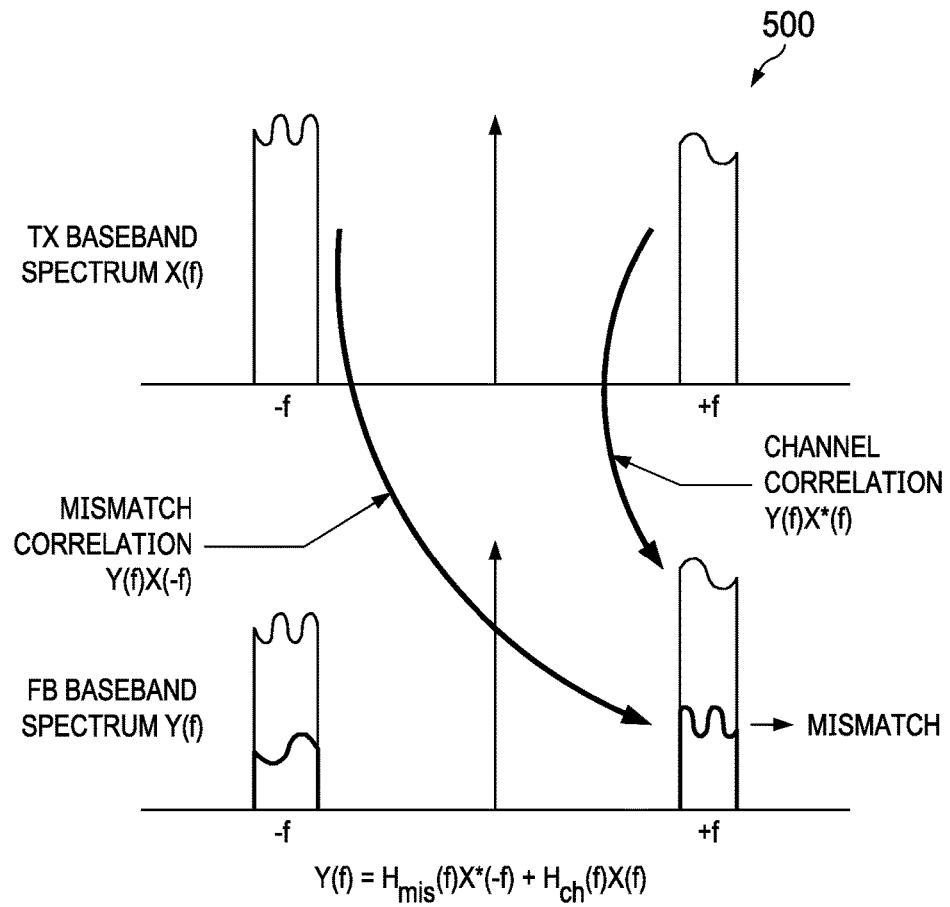
FIG. 5 is a graph showing frequency-domain mismatch and channel correlations in accordance with some examples.

FIG. 5 is a graph 500 showing mismatch and channel correlations (related to the operations of blocks 406, 410, and 412 in FIG. 4A and/or related to the operations of blocks 436 and 438 in FIG. 4B) in accordance with some examples. In the graph 500, a TX baseband data signal spectrum, X(f), and a FB baseband data signal spectrum, Y(f), are represented. A first correlation based on X(f) and Y(−f) is a mismatch correlation determined by Y(f)X(−f). A second correlation based on X*(f) and Y(f) is a channel correlation determined by Y(f)X*(f). In some examples, mismatch and channel correlations are used to estimate the observed residual mismatch, $H_{mis}(f)$, at each available frequency, where the observed residual mismatch is the mismatch as seen in the FB baseband data signal (e.g., FB baseband data signal 252 in FIG. 2) after employing the current multi-tap corrector. The ratio of the observed residual mismatch with channel estimate, $H_{ch}(f)$, gives the actual residual mismatch estimate for a given bin. In some examples, estimation of $H_{mis}(f)$ and $H_{ch}(f)$ is performed using multiple correlation statistics for each signal, X(f) and Y(f), and image frequency bin pair. Y(f)X(−f) on aggregation leads to residual observed mismatch, $H_{mis}(f)$. Also, Y(f)X*(f) on aggregation results in channel estimate, $H_{ch}(f)$. Note: $Y(f) = H_{mis}(f)X*(−f) + H_{ch}(f)X(f)$.

Figure 6:
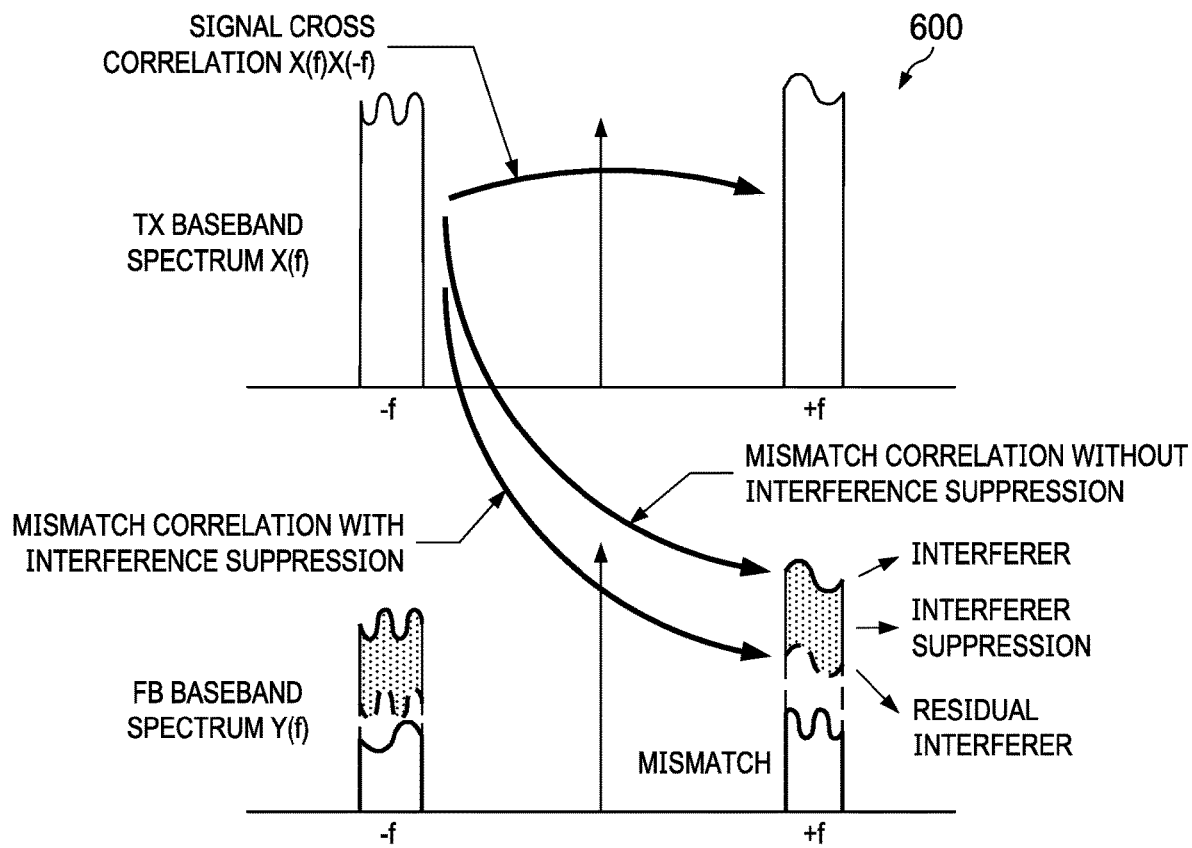
FIG. 6 is a graph showing frequency-domain mismatch correlations and a signal cross correlation in accordance with some examples.

FIG. 6 is a graph 600 showing mismatch correlations and a signal cross correlation (related to the operations of blocks 406, 410, and 412 in FIG. 4A and/or related to the operations of blocks 436 and 438 in FIG. 4B) in accordance with some examples. Residual observed mismatch estimation is several degraded by the presence of TX signal at the image bin, which acts as an interferer. To account for this issue, the interference from the TX signal at +f in aggregated mismatch correlation is predicted and suppressed. In some examples, this is done using an aggregated signal cross correlation, $\Sigma X(f)X(−f)$, and a tracked channel estimate, $H_{ch}^{[<]BEGINITALm}(f)$. The residual observed mismatch estimate is given as:

$$\hat{H}_{mis}(f) = \sum \frac{Y(f) - X(-f) - \left(\sum X(f)X(-f)\right)\hat{H}_{ch}(f)}{\sum |X(-f)|^2}.$$

If $H_{ch}^{[<]BEGINITALm}(f)$ is completely accurate, then the interference is completely suppressed. The estimation error in $H_{ch}^{[<]BEGINITALm}(f)$ results in some residual interference which needs lesser averaging. As an example, 40 dB suppression reduces convergence time significantly from 6 s to 600 us. In some examples, a quality metric of the residual observed mismatch estimate is computed after accounting for the amount of interference suppression. The power in the image band is the sum of the signal interferer power, image power, and noise. Thus, a data aided quality metric estimates only the level of suppressed interferer and noise power. In some examples, quality metrics are estimated using the three aggregated correlations at a lower rate. In some examples, quality metrics are used for history maintenance of channel estimates and mismatch estimates as described herein.

Figure 7:
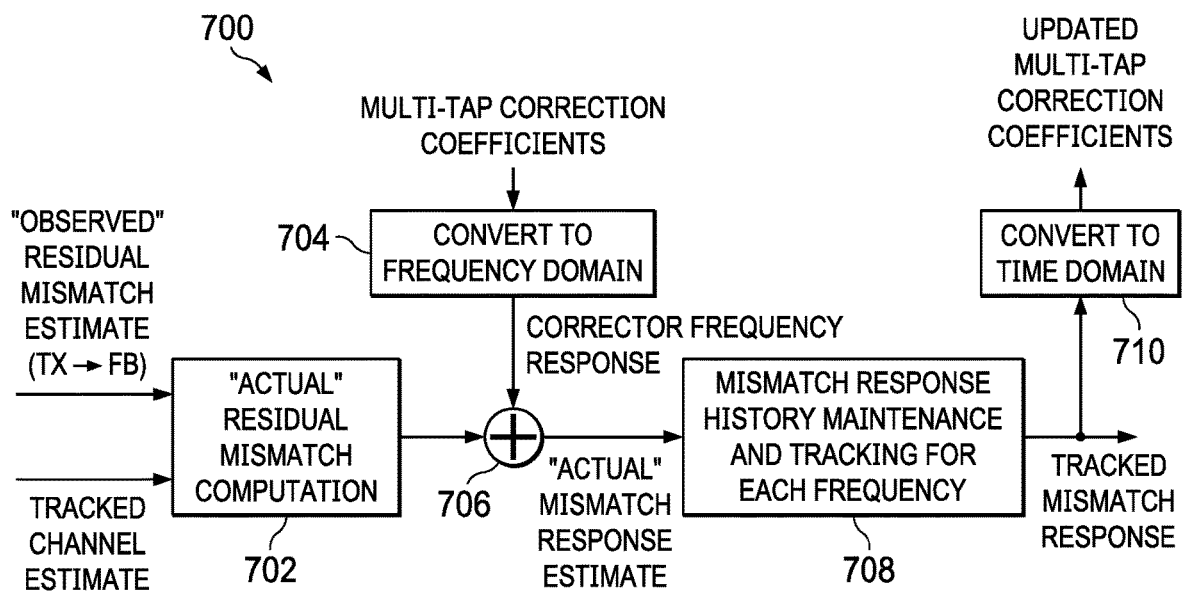
FIG. 7 is a flowchart showing a frequency-domain IQ mismatch estimation and correction method in accordance with some examples.

FIG. 7 is a block diagram showing a frequency-domain IQ mismatch estimation and correction method 700 in accordance with some examples. As shown, the method 700 includes performing an actual residual mismatch computation at block 702 (e.g., to perform the operations of block 440 in FIG. 4B) based on an observed residual mismatch estimate (the change in the FB baseband data signal 252 relative to the TX baseband data signal 202) and a tracked channel estimate. The output of block 702 is provided to an adder block 706 (e.g., to perform the operations of block 444 in FIG. 4B) to combine the actual residual mismatch with a corrector frequency response obtained from a time-to-frequency converter block 704, which provides the frequency response for the current set of multi-tap correction coefficients.

The output of the adder block 706 is an actual mismatch response estimate, which is provided to block 708 (to perform the operations of block 446 in FIG. 4B). As represented in method 700, block 708 performs mismatch response history maintenance and tracking for each frequency. The tracked mismatch response output from block 708 is provided to block 710, which converts the tracked mismatch response from frequency-to-time, resulting in updated multi-tap correction coefficients.

With the method 700, the observed residual mismatch estimate at each available frequency bin is divided by the channel estimate at that frequency bin to convert to actual residual mismatch. The actual residual mismatch estimate is added to the frequency response of the multi-tap correction filter to convert to actual mismatch. In some examples, the history of the actual mismatch estimate is maintained individually for each of a plurality of frequencies. As the signal profile changes, estimated are obtained over the union of all the frequencies observed. In this manner, correction is possible across all the profiles. Also, no re-convergence for changing signal profiles is needed.

Figure 8A:
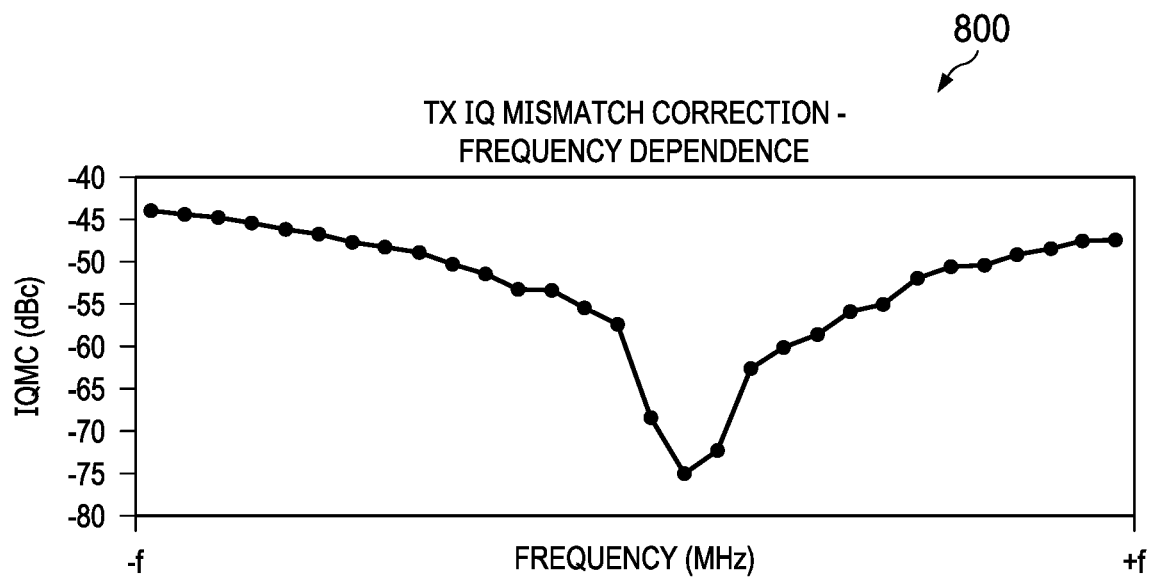
FIGS. 8A and 8B are graphs showing IQ mismatch correction as a function of frequency with and without the proposed frequency-domain IQ mismatch estimation in accordance with some examples.
Figure 8B:
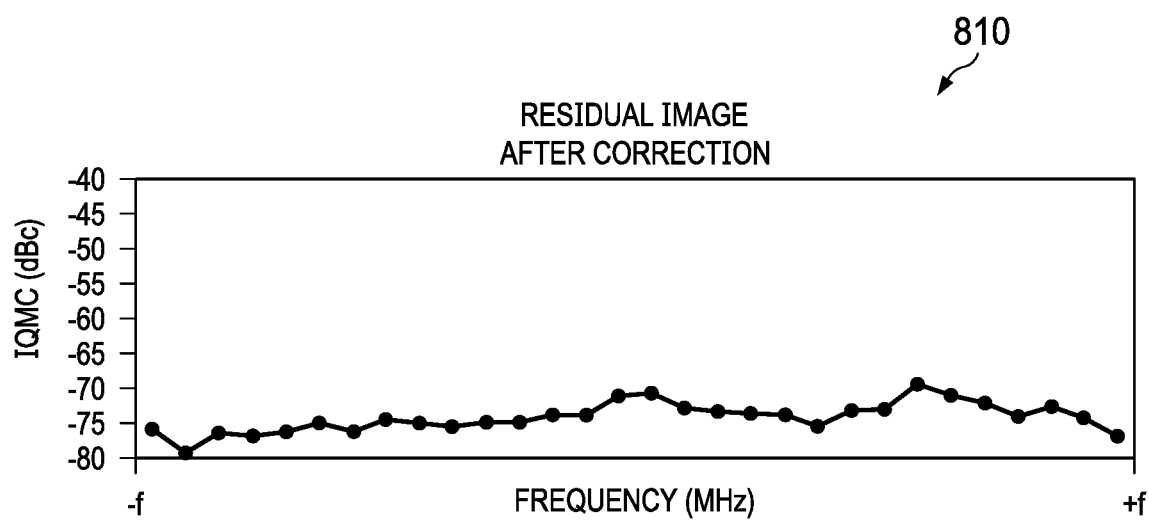

FIGS. 8A and 8B are graphs showing IQ mismatch correction as a function of frequency with and without the proposed frequency-domain IQ mismatch estimation in accordance with some examples. In graph 800 of FIG. 8A, IQ mismatch correction is represented after trimming at one frequency. With dynamic signal conditions across time, re-convergence is needed for every new input frequency. FIG. 8B is a graph 810 showing IQ mismatch correction for each frequency represented based on the proposed frequency-domain IQ mismatch estimation and correction options described herein.

Figure 9:
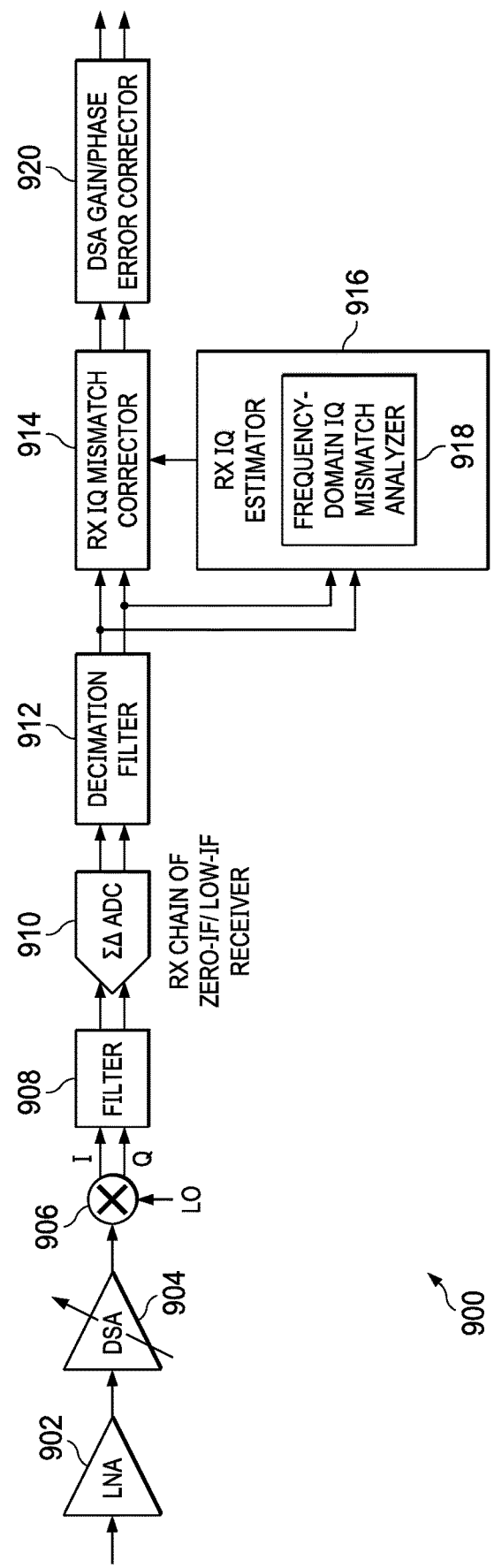
FIG. 9 is a diagram showing a receiver topology with frequency-domain IQ mismatch analysis in accordance with some examples.

FIG. 9 is a diagram showing a receiver topology 900 with frequency-domain IQ mismatch estimation and correction in accordance with some examples. As shown, the receiver topology 900 includes a low-noise amplifier 902 followed by a digital-step attenuator (DSA) 904. The output of the DSA 904 is input to a mixer 906, which combines the DSA output with a local oscillator (LO) signal. The output of the mixer 906 includes IQ components, which are provided to a filter 908. The output of the filter 908 is input to an analog-to-digital converter (ADC) 910 (e.g., a sigma-delta ADC). The output of the ADC 910 is provided to a decimation filter 912, which downsamples the ADC output. The output of the decimation filter 912 is provided to an RX IQ mismatch corrector 914 and an RX IQ estimator 916. As shown, the RX IQ estimator 916 includes a frequency-domain IQ mismatch analyzer 918 and is configured to determine and/or update multi-tap correction coefficients for use by the RX IQ mismatch corrector 914 based on frequency-domain IQ mismatch analysis as described herein. The output of the RX IQ mismatch corrector 914 is provided to a DSA gain/phase error corrector 920, which provides gain/phase adjustments to the DSA 904 based on the output of the RX IQ mismatch corrector 914.

Figure 10:
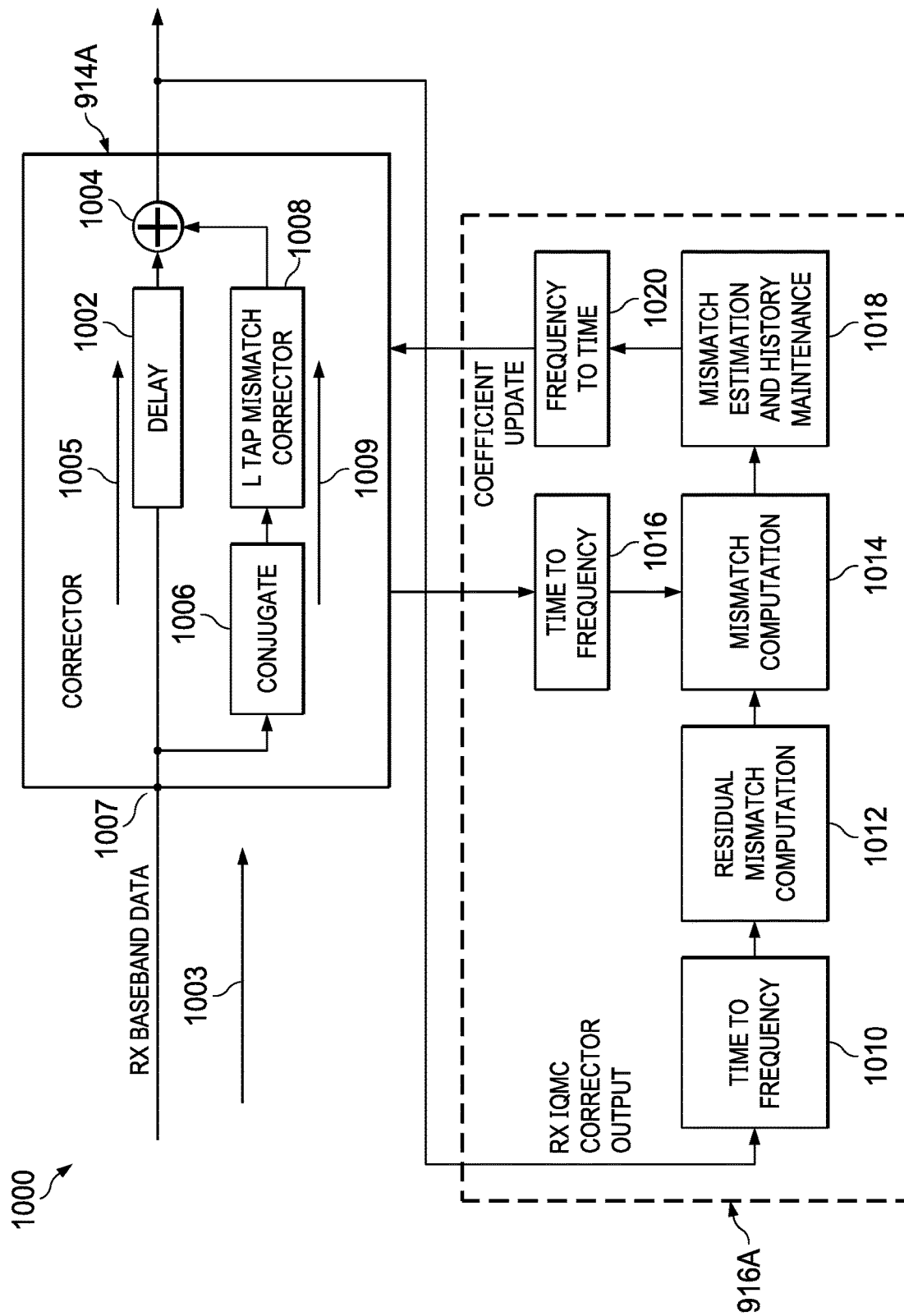
FIG. 10 is a diagram showing an IQ mismatch estimation and correction topology for a receiver data path with frequency-domain IQ mismatch analysis in accordance with some examples.

FIG. 10 is a diagram showing an IQ mismatch estimation and correction topology 1000 for a receiver data path (e.g., the receiver topology 900 of FIG. 9) with frequency-domain IQ mismatch analysis in accordance with some examples. With the IQ mismatch estimation and correction topology 1000, IQ mismatch estimation and correction is performed for available frequencies of an RX baseband data signal based on frequency-domain IQ mismatch analysis operations.

As shown, the IQ mismatch estimation and correction topology 1000 includes a RX IQ mismatch corrector 914A (an example of the RX IQ mismatch corrector 914 in FIG. 9) along an RX data path 1003 that provides an RX baseband data signal. More specifically, the RX IQ mismatch corrector 914A includes a combine circuit 1004 and a delay line path 1005 between the combine circuit 1004 and an input node 1007 of the RX IQ mismatch corrector 914A. The RX IQ mismatch corrector 914A also includes a mismatch correction path 1009 separate from the delay line path 1005. The mismatch correction path 1009 is between the input node 1007 and the combine circuit 1004. In the example of FIG. 10, the mismatch correction path 1009 includes a conjugate circuit 1006 coupled to a multi-tap (e.g., L-tap) correction circuit 1008, where the multi-tap correction circuit 1008 uses multi-tap correction coefficients to perform frequency-dependent IQ mismatch correction. The multi-tap correction coefficients for the multi-tap correction circuit 1008 are provided by an RX IQ estimator 916A (an example of the RX IQ estimator 916 in FIG. 9).

In the example of FIG. 10, the RX IQ estimator 916A includes various blocks, which correspond to frequency-domain IQ mismatch analysis operations performed by hardware (e.g., an FFT engine) and/or a processor executing instructions stored in memory. Specifically, the RX IQ estimator 916A includes a time-to-frequency block 1010, which provides windowed FFT values of an RX baseband data signal received from the RX data path 1003. In different examples, the size of the windows used to generate the FFT values depends on a target frequency sensitivity. Also, the speed of the time-to-frequency converters 1010 varies in different examples. In one example, the time-to-frequency converter 1010 operates at a speed of 2 us.

In the example of FIG. 10, the output of the time-to-frequency converter 1010 is input to a residual mismatch computation block 1012, which computes a residual mismatch estimate based on frequency bin values of an RX baseband data signal obtained from the time-to-frequency converter 1010. In some examples, the residual mismatch computation block 1012 computes an aggregate residual mismatch estimate based on correlation computations, power computations, and validity conditions. Also, in some examples, quality estimates are computed and provided to the mismatch estimation and history maintenance block 1018 to facilitate filtering operations.

The residual mismatch estimate is output to a mismatch computation block 1014, which determines a mismatch estimate by adding the residual mismatch estimate to frequency-domain values for a current set of multi-tap correction coefficients. As shown, the frequency-domain values are provided by a time-to-frequency converter 1016 coupled to the RX IQ mismatch corrector 914A to receive the current set of multi-tap correction coefficients. In other examples, the current set of multi-tap correction coefficients are stored by the RX IQ mismatch corrector 914A for use by the mismatch computation block 1014. The output of the mismatch computation block 1014 is provided to a mismatch estimation and history maintenance block 1018, which combines the mismatch estimate from the mismatch computation block 1014 to a mismatch estimate history for each frequency bin. In some examples, the mismatch estimation and history maintenance block 1018 uses a Kalman filter or similar filter to weight mismatch estimation values for each frequency bin as new frequency-domain data is received. The output of the mismatch estimation and history maintenance block 1018 is provided to a frequency-to-time converter 1020 to generate updated multi-tap correction coefficients for use by the RX IQ mismatch corrector 914A.

In some examples, the RX IQ estimator 916A performs the example algorithm given below.

Example RX IQ Mismatch Estimation Algorithm for the RX IQ Estimator 916A

Collect an RX baseband data chunk at the output of the RX IQ mismatch corrector
  Window the data x(t), by a standard window function like Black-Mann Harris.
  Compute FFT on the windowed base-band data to convert to frequency domain and obtain X(f).
Compute correlation of the RX signal at +f and −f along with the quality metrics
  Correlations computed, Mismatch correlation or Signal cross correlation X(f)X(−f),
  Powers Computed ‖X(−f)‖², ‖X(f)‖²
This correlation and powers are used for mismatch estimation at either +f or −f depending on the validity conditions described below
The correlation and powers are aggregated across multiple data chunks based on defined validity conditions
  For residual mismatch estimation at +f(leakage into +f from −f), Rx Signal power at −f should be larger and at +f should be smaller than respective thresholds
  Similarly for residual mismatch estimation at −f (leakage into −f from +f), RX signal power at +f should be larger and at −f should be smaller than respective thresholds
The mismatch correlation X(f)X(−f), when aggregated across multiple data chunks will give an averaged estimate
A quality metric is computed for the mismatch estimate using the aggregated powers
For every frequency bin, the residual mismatch is added with the frequency response of the current mismatch corrector configuration to convert to mismatch estimate.

For every frequency bin, the mismatch estimate is input to a tracking filter (e.g., a Kalman filter) which tracks the mismatch response at each frequency bin.

The tracked mismatch frequency response is converted to a time domain correction filter coefficients and programmed back into a mismatch correction filter in the Rx baseband path In the correction module, the conjugated input RX baseband data signal is passed through the correction filter and subtracted from the delayed input RX baseband data signal, where the delay is selected to match the group delay of the correction filter.

In an alternate embodiment, the correction can be implemented by first passing the input signal through a correction filter followed by conjugation before subtraction on the main path. Note that the correction filter in this case, in the time domain, will simply be a conjugate of the time domain correction filter in the original case.

In another variant of the RX IQMC algorithm, the RX base-band data for estimation is taken at input of the RX IQ mismatch corrector. In that variant, the correlations provide the complete estimate and not residual estimate. Hence there is no need to add the frequency response of the current corrector coefficients.

Example RX IQ Mismatch Estimation Equations Used by the RX IQ Estimator 916A:

$$\hat{H_{Rxmismatch}}(f) = \frac{\sum X(f)X(-f)}{\sum |X(-f)|^2}$$

$$\text{Quality}(\hat{H_{Rxmismatch}}(f)) = \frac{(\sum |X(f)|^2)(\sum |X(-f)|^2) - |\sum X(f)X(-f)|^2}{N*(\sum |X(-f)|^2)^2},$$

where N is the number of aggregations.

With the proposed frequency-domain IQ mismatch estimation and correction options, frequency bin based correlations are performed. Example correlations based on frequency bin values include TX to FB mismatch, channel estimation, and related uncertainty metrics. In some examples, a mismatch correlation, a signal cross correlation, a channel correlation, TX baseband data signal and image Powers, and FB baseband data signal powers are computed. Also, separate bin based validity checks and aggregation of the correlations for mismatch and channel estimation are performed. Also, residual apparent mismatch estimation is aided by signal cross correlation and tracked channel estimate to suppress the effect of strong interferer (signal) at the image bin. Also, a quality metric is computed for the residual apparent mismatch estimate accounts for amount of suppression of the interferer using signal cross correlation. Also, the ratio of residual apparent mismatch and channel estimate is the estimate of residual mismatch. This residual mismatch is added to the frequency response of the corrector filter and tracked across time using a Kalman filter (or a similar filter)

In contrast to time domain approached for tracking a correction filter, the proposed solution adapts a frequency domain based tracking of mismatch response. The proposed solution keeps track of mismatch responses across frequencies, updates mismatch responses on frequency bins where estimates are currently available, and maintains all the previous information at other bins. Accordingly, the combined solution can combine mismatch estimates from multiple signal scenarios and combine them effectively to get a correction filter which works for all scenarios.

One of the main advantage is that the proposed solution is compatible with varying signal scenarios with good IQ image suppression even immediately after signal scenario switch. Thus, the proposed solution is able to track and correct frequency dependent mismatch. Also, the proposed solution has very small convergence time due to suppression of effect of TX baseband data signal at +f on the FB baseband data signal at +f, since this acts as an interferer for mismatch estimation of the TX baseband data signal at −f to the FB baseband data signal at +f.

In some examples, TX and FB baseband data chunks are collected synchronously. The TX and FB baseband data chunks are multiplied by a window function and an FFT engine is used to convert to frequency domain. Once frequency-domain values for the TX and FB baseband data chunks are obtained, multiple correlation statistics from available TX and FB frequency bins are analyzed to obtain apparent mismatch and channel estimates along with their quality metrics. In some examples, apparent mismatch is the mismatch response from the TX baseband data signal at −f to the FB baseband data signal at +f. Also, the channel estimate is the overall channel response from the TX baseband data signal to the FB baseband data signal (includes TX and FB data paths)

In some examples, the channel estimates or parameters are used to suppress the effect of interference in IQ mismatch estimation. More specifically, the interference from the baseband data signal at +f in aggregated mismatch correlations is predicted and suppressed. This is done using aggregated signal cross correlation X(f)X(−f) and channel estimate. Also, a data driven quality metric computation estimates only residual interferer power and noise power.

In some examples, observed residual IQ mismatch, channel parameters, and current multi-tap correction coefficients are used to determine updated actual IQ mismatch parameters. The observed residual mismatch estimate at each frequency is scaled by the channel estimate at that frequency to convert to actual residual mismatch and added with the frequency response of the multi-tap correction filter to convert to actual IQ mismatch.

In some examples, with the proposed frequency-domain IQ mismatch estimation and correction options, frequency bin based correlation is performed to determine TX to FB mismatch, channel estimation, and their uncertainty metrics. As desired, computation of mismatch correlation, TX positive (+f) and negative (−f) correlation, channel correlation, TX signal and image powers, and FB signal powers are performed. Separate bin based validity checks and aggregation of the correlations for mismatch and channel estimation is performed, where mismatch estimation is aided by TX positive and negative correlation and where the channel estimate is tracked to minimize the effect of strong signal at image bin. Also, the ratio of mismatch and channel estimate is tracked across time using a filter that accounts for current data and historical data. Also, uncertainty metrics are computed for the mismatch ratio estimate to account for amount of suppression provided by strong signal minimization.

In some examples, an electrical system (e.g., the electrical system 100 in FIG. 1) includes a transceiver (e.g., the transceiver 102) with an IQ estimator (e.g., the TX IQ estimator 114 or an RX IQ estimator 916 as in FIG. 9) and an IQ mismatch corrector (e.g., the TX IQ mismatch corrector 104 in FIG. 1, or the RX IQ mismatch corrector 914 in FIG. 9). The electrical system also includes an antenna (e.g., the antenna 120 in FIG. 1) coupled to the transceiver.

The IQ estimator is configured to perform frequency-domain IQ mismatch analysis to determine an IQ mismatch estimate at each available frequency bin of a baseband data signal (e.g., using TX and FB baseband data signals as in FIGS. 1, 4A, and 4B, or using an RX baseband data signal as in FIGS. 9 and 10). The IQ mismatch corrector is configured to correct the baseband data signal based on the IQ mismatch estimate.

In some examples, the IQ estimator and the IQ mismatch corrector are coupled to a downscaler output (e.g., the output of the decimation filter 912 in FIG. 9) along a receiver data path of the receiver. In some examples, the IQ mismatch corrector is coupled to an upscaler input (e.g., the input of the interpolator 206 in FIGS. 2 and 4A) along a transmitter data path of the transceiver.

In some examples, the IQ estimator is configured to compute a residual IQ mismatch for each frequency bin of a baseband data signal. Also, the IQ estimator is configured to compute the IQ mismatch estimate by adding the residual IQ mismatch to frequency-domain data for a current set of multi-tap correction coefficients. In some examples, the IQ estimator is configured to update an IQ mismatch history at each frequency bin based on the IQ mismatch estimate and a filter that accounts for current data and historical data. Also, the IQ estimator is configured to output updated multi-tap correction coefficients to the IQ mismatch corrector based on the IQ mismatch history.

In some examples, the IQ estimator is configured to compute the residual IQ mismatch as an aggregate residual mismatch estimate based on a channel estimate and an aggregate observed residual mismatch estimate determined from frequency-domain analysis of a transmitter baseband data signal and a feedback baseband data signal.

In some examples, the IQ mismatch corrector includes a combine circuit (e.g., the combine circuit 456 in FIG. 4B, or the combine circuit 1004 in FIG. 10). The IQ mismatch corrector also includes a delay circuit (e.g., the delay circuit 452 in FIG. 4B, or the delay circuit 1002 in FIG. 10) between the data path (e.g., the data path 460 in FIG. 4B, or comparable path in FIG. 10) and the combine circuit. The IQ mismatch corrector also includes a multi-tap correction path (e.g., path 462 in FIG. 4B, or comparable path in FIG. 10) in parallel with the delay circuit between the data path and the combine circuit. The multi-tap correction path includes a multi-tap correction circuit (e.g., the multi-tap correction circuit 454 in FIG. 4B, or the multi-tap correction circuit 1008 in FIG. 10) with multi-tap correction coefficients based on the determined IQ mismatch estimate. In some examples, the IQ estimator is configured to update the multi-tap correction coefficients by predicting and suppressing interference in the IQ mismatch estimation. In some examples, the IQ mismatch corrector is configured to continuously apply a digital pre-distortion (DPD) algorithm in parallel with the frequency-domain IQ mismatch analysis.

In some examples, the IQ estimator is configured to compute the residual IQ mismatch based on a mismatch estimate given as:

$$\hat{H}_{mis}(f) = \frac{\sum Y(f) - X(-f) - (\sum X(f)X(-f))\hat{H}_{ch}(f)}{\sum |X(-f)|^2}.$$

where X(f) is a spectrum of a transmitter baseband data signal, where X(−f) is an image of the transmitter baseband data signal, where Y(f) is a spectrum of a feedback baseband data signal, where Y(−f) is an image of the feedback baseband data signal, and where $H_{ch}(f)$ is a channel estimate. Also, in some examples, the IQ estimator is configured to compute the residual IQ mismatch based on:

$$\hat{H}_{mis\_act}(f) = \frac{\hat{H}_{mis}(f)}{\hat{H}_{ch}(f)},$$

where $\hat{H}_{mis}(f)$ is a mismatch estimate as a function of frequency, and where $\hat{H}_{ch}(f)$ is a channel estimate as a function of frequency.

In some examples, a transceiver includes a data path (e.g., a TX data path as in FIGS. 1, 2, 4A, and 4B, or an RX data path as in FIGS. 9 and 10). The transceiver also includes an IQ estimator and an IQ mismatch corrector along the data path. The IQ estimator comprises a time-to-frequency converter (e.g., the time-to-frequency converters 433 and 434 in FIG. 4B, or the time-to-frequency converter 1010 in FIG. 10). The IQ estimator also comprises a processor (corresponding to blocks 406, 408, 410, 412, 414, 416, 418, and 420 in FIG. 4A, corresponding to blocks 436, 438, 440, 444, and 446 in FIG. 4B, or corresponding to blocks 1012, 1014, and 1018 in FIG. 10) coupled to the time-to-frequency converter. The processor is configured to compute a residual IQ mismatch based on frequency bin values of a baseband data signal output by the time-to-frequency converter. The processor is also configured to compute an IQ mismatch estimate by adding the residual IQ mismatch to frequency-domain data for a current set of multi-tap correction coefficients. The IQ estimator also includes a frequency-to-time converter (e.g., the frequency-to-time converter 448 in FIG. 4B, or the frequency-to-time converter 1020 in FIG. 10) coupled to the processor and configured to output updated multi-tap correction coefficients to the IQ mismatch corrector based on the computed IQ mismatch estimate.

In some examples, the data path is a receiver data path, and the IQ estimator and the IQ mismatch corrector are coupled to a downscaler output (e.g., the output of the decimation filter 912 in FIG. 9) along the receiver data path. In such examples, the processor is configured to compute the residual mismatch as:

$$\hat{H}_{Rxmismatch}(f) = \frac{\sum X(f)X(-f)}{\sum |X(-f)|^2},$$

where $X(f)$ is a spectrum of a receiver baseband data signal, where $X(-f)$ is an image of the receiver baseband data signal.

In some examples, the data path is a transmitter data path, and the IQ mismatch corrector are coupled to an upscaler input (e.g., the input of the interpolator 206 in FIGS. 2 and 4A) along the transmitter data path.

In some examples, the processor is configured to predict and suppress interference in the IQ mismatch estimate based on a mismatch estimate given as:

$$\hat{H}_{mis}(f) = \frac{\sum Y(f) - X(-f) - (\sum X(f)X(-f))\hat{H}_{ch}(f)}{\sum |X(-f)|^2},$$

where $X(f)$ is a spectrum of a transmitter baseband data signal, where $X(-f)$ is an image of the transmitter baseband data signal, where $Y(f)$ is a spectrum of a feedback baseband data signal, where $Y(-f)$ is an image of the feedback baseband data signal, and where $\hat{H}_{ch}(f)$ is a channel estimate. In some examples, the processor is configured to predict and suppress interference in the IQ mismatch estimate based on a mismatch estimate given as:

$$\hat{H}_{mis}(f) = \frac{\sum Y_c(f)X(-f)}{\sum |X(-f)|^2},$$

where $Y_c(f) = Y(f) - X(f)\hat{H}_{ch}(f)$, where $X(f)$ is a spectrum of a transmitter baseband data signal, where $X(-f)$ is an image of the transmitter baseband data signal, where $Y(f)$ is a spectrum of a feedback baseband data signal, where $Y(-f)$ is an image of the feedback baseband data signal, and where $\hat{H}_{ch}(f)$ is a channel estimate.

In some examples, the processor is configured to compute the residual IQ mismatch based on:

$$\hat{H}_{mis\_act}(f) = \frac{\hat{H}_{mis}(f)}{\hat{H}_{ch}(f)},$$

where $\hat{H}_{mis}(f)$ is a mismatch estimate as a function of frequency, and where $\hat{H}_{ch}(f)$ is a channel estimate as a function of frequency.

In some examples, the processor is configured to update an IQ mismatch history at each frequency bin based on the IQ mismatch estimate and a filter that accounts for current data and historical data, and wherein the frequency-to-time converter is configured to output the multi-tap correction coefficients to the IQ mismatch corrector based on the IQ mismatch history. In some examples, the processor is configured to compute the residual IQ mismatch as an aggregate residual mismatch estimate based on channel estimate and an aggregate observed residual mismatch estimate determined from frequency-domain analysis of a transmitter baseband data signal and a feedback baseband data signal.

In some examples, a method includes receiving a baseband data signal along a data path (e.g., receiving a TX baseband data signal and FB baseband data signal as in FIGS. 1, 2, 4A and 4B, or receiving an RX baseband data signal as in FIGS. 9 and 10). The method also includes generating frequency-domain values for the baseband data signal (e.g., the operation of the time-to-frequency converters 433 and 434 in FIG. 4B, or the operation of the time-to-frequency converter 1010 in FIG. 10). The method also includes computing a residual IQ mismatch (e.g., the operations of blocks 436 and 440 in FIG. 4B, or the operations of block 1012 in FIG. 10) based on the frequency-domain values. The method also includes computing an IQ mismatch estimate (e.g., the operation of block 444 in FIG. 4B, or the operation of block 1014 in FIG. 10) by adding the residual IQ mismatch to frequency-domain data for a current set of multi-tap correction coefficients. The method also includes using the IQ mismatch estimate to determine updated multi-tap correction coefficients (the output of the frequency-to-time converter 448 in FIG. 4B, or the output of the frequency-to-time converter 1020 in FIG. 10). The method also includes applying the updated multi-tap correction coefficients along the data path (e.g., applied to DSA 904 in the receiver topology in FIG. 9, or applied to the input of the interpolator 206 in the transmitter topology in FIG. 4A).

In some examples, the method also includes updating an IQ mismatch history (e.g., the operation of block 436 in FIG. 4B, or the operation of block 1018 in FIG. 10) at each frequency bin based on the IQ mismatch estimate and a filter that accounts for current data and historical data. The method also includes using the IQ mismatch history to provide the updated multi-tap correction coefficients to an IQ mismatch corrector (e.g., the output of block 446 is input to the frequency-to-time converter 448 in FIG. 4B, or the output of block 1018 is input to the frequency-to-time converter 1020 in FIG. 10).

In some examples, the method includes computing the residual IQ mismatch as an aggregate residual mismatch estimate (e.g., the operation of block 440 in FIG. 4B) based on a channel estimate (e.g., the operation of block 438 in FIG. 4B) and an aggregate observed residual mismatch estimate (e.g., the operation of block 436 in FIG. 4B) determined from frequency-domain analysis of a transmitter baseband data signal and a feedback baseband data signal. In some examples, the method also includes maintaining a channel estimate history (e.g., the operation of block 446 in FIG. 4B, or the operation of block 1018 in FIG. 10) based on a filter that accounts for current data and historical data and based on the channel estimate for each frequency bin.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A system comprising:
   an in-phase/quadrature (IQ) mismatch estimator configured to:
     generate frequency-domain values, for a baseband data signal, at frequency bins; and
     determine an IQ mismatch based on the frequency-domain values; and
   an IQ mismatch corrector configured to correct the baseband data signal based on the determined IQ mismatch.

2. The system of claim 1, further comprising a receiver including a downscaler having an output, and wherein the IQ mismatch estimator and the IQ mismatch corrector are coupled to the downscaler output.

3. The system of claim 1, further comprising a transmitter including an upscaler having an input, and wherein the IQ mismatch corrector is coupled to the upscaler input.

4. The system of claim 1, wherein the IQ mismatch estimator is configured to:
   determine a residual IQ mismatch using the frequency-domain values for the baseband data signal; and
   determine the IQ mismatch by adding the residual IQ mismatch to frequency-domain values for a current set of multi-tap correction coefficients.

5. The system of claim 4, wherein the IQ mismatch estimator includes a filter configured to track an IQ mismatch history that includes current and historical mismatch data, and wherein the IQ mismatch estimator is configured to:
   update the IQ mismatch history, at the frequency bins, based on the determined IQ mismatch; and
   output updated multi-tap correction coefficients to the IQ mismatch corrector based on the IQ mismatch history.

6. The system of claim 4, wherein the IQ mismatch estimator is configured to determine the residual IQ mismatch based on a mismatch estimate given as:

$$\hat{H}_{mis}(f) = \frac{\sum Y(f) - X(-f) - \left(\sum X(f)X(-f)\right)\hat{H}_{ch}(f)}{\sum |X(-f)|^2},$$

where X(f) is a spectrum of a transmitter baseband data signal, where X(−f) is an image of the transmitter baseband data signal, where Y(f) is a spectrum of a feedback baseband data signal, where Y(−f) is an image of the feedback baseband data signal, and where $\hat{H}_{ch}(f)$ is a channel estimate.

7. The system of claim 6, wherein the IQ mismatch estimator is configured to determine the residual IQ mismatch based on:

$$\hat{H}_{mis\_act}(f) = \frac{\hat{H}_{mis}(f)}{\hat{H}_{ch}(f)},$$

where $\hat{H}_{mis}(f)$ is a mismatch estimate as a function of frequency, and where $\hat{H}_{ch}(f)$ is a channel estimate as a function of frequency.

8. A transceiver comprising:
   an IQ mismatch corrector; and
   an IQ mismatch estimator coupled to the IQ mismatch corrector, wherein the IQ mismatch estimator comprises:
     a time-to-frequency converter configured to provide frequency domain data, for a baseband data signal, at frequency bins;
     a processor coupled to the time-to-frequency converter, wherein the processor is configured to:
       determine a residual IQ mismatch based on the frequency-domain data for the baseband data signal; and
       determine an IQ mismatch by adding the residual IQ mismatch to frequency-domain data for a current set of multi-tap correction coefficients; and
     a frequency-to-time converter coupled to the processor and configured to output updated multi-tap correction coefficients to the IQ mismatch corrector based on the determined IQ mismatch.

9. The transceiver of claim 8, further comprising a receiver including a downscaler having an output, and wherein the IQ mismatch estimator and the IQ mismatch corrector are coupled to the downscaler output.

10. The transceiver of claim 8, further comprising a transmitter including an upscaler having an input, and wherein the IQ mismatch corrector is coupled to the upscaler input.

11. The transceiver of claim 8, wherein the IQ mismatch estimator further comprises a filter configured to track an IQ mismatch history that includes current and historical mismatch data, wherein the processor is configured to update the IQ mismatch history, at the frequency bins, based on the determined IQ mismatch, and wherein the frequency-to-time converter is configured to output the multi-tap correction coefficients to the IQ mismatch corrector based on the IQ mismatch history.

12. The transceiver of claim 8, wherein the processor is configured to determine the residual IQ mismatch as an aggregate residual mismatch based on a channel estimate and an aggregate observed residual mismatch determined from frequency-domain analysis of the baseband data signal and a feedback baseband data signal.

13. The transceiver of claim 8, wherein the processor is configured to determine the residual IQ mismatch based on a mismatch estimate given as:

$$\hat{H}_{Rxmismatch}(f) = \frac{\sum X(f)X(-f)}{\sum |X(-f)|^2},$$

where X(f) is a spectrum of a receiver baseband data signal, where X(−f) is an image of the receiver baseband data signal.

14. The transceiver of claim 8, wherein the processor is configured to determine and suppress interference in the determined IQ mismatch based on a mismatch estimate given as:

$$\hat{H}_{mis}(f) = \frac{\sum Y(f) - X(-f) - (\sum X(f)X(-f))\hat{H}_{ch}(f)}{\sum |X(-f)|^2},$$

where X(f) is a spectrum of a transmitter baseband data signal, where X(−f) is an image of the transmitter baseband data signal, where Y(f) is a spectrum of a feedback baseband data signal, where Y(−f) is an image of the feedback baseband data signal, and where $\hat{H}_{ch}(f)$ is a channel estimate.

15. The transceiver of claim 8, wherein the processor is configured to determine and suppress interference in the determined IQ mismatch based on a mismatch estimate given as:

$$\hat{H}_{mis}(f) = \frac{\sum Y_c(f)X(-f)}{\sum |X(-f)|^2},$$

where $Y_c(f) = Y(f) - X(f)\hat{H}_{ch}(f)$, where X(f) is a spectrum of a transmitter baseband data signal, where X(−f) is an image of the transmitter baseband data signal, where Y(f) is a spectrum of a feedback baseband data signal, where Y(−f) is an image of the feedback baseband data signal, and where $\hat{H}_{ch}(f)$ is a channel estimate.

16. The transceiver of claim 8, wherein the processor is configured to determine the residual IQ mismatch based on:

$$\hat{H}_{mis\_act}(f) = \frac{\hat{H}_{mis}(f)}{\hat{H}_{ch}(f)},$$

where $\hat{H}_{mis}(f)$ is a mismatch estimate as a function of frequency, and where $\hat{H}_{ch}(f)$ is a channel estimate as a function of frequency.

17. A method, comprising:
receiving a baseband data signal;
generating frequency-domain values for the baseband data signal;
determining a residual IQ mismatch based on the frequency-domain values for the baseband data signal;
determining an IQ mismatch by adding the residual IQ mismatch to frequency-domain data for a current set of multi-tap correction coefficients;
determining updated multi-tap correction coefficients using the determined IQ mismatch; and
correcting the baseband data signal using the updated multi-tap correction coefficients.

18. The method of claim 17, further comprising:
updating, based on the determined IQ mismatch, an IQ mismatch history that includes current and historical data at the frequency bins; and
providing the updated multi-tap correction coefficients to an IQ mismatch corrector based on the IQ mismatch history.

19. The method of claim 17, further comprising determining the residual IQ mismatch as an aggregate residual mismatch based on a channel estimate and an aggregate observed residual mismatch determined from frequency-domain analysis of a transmitter baseband data signal and a feedback baseband data signal.

20. The method of claim 19, further comprising maintaining a channel estimate history using a filter that tracks current data and historical data corresponding to the channel estimate at the frequency bins.

* * * * *